United States Patent
Yasunaga et al.

(10) Patent No.: US 10,436,972 B2
(45) Date of Patent: Oct. 8, 2019

(54) LIGHTING UNIT AND DISPLAY DEVICE

(71) Applicant: Sharp Kabushiki Kaisha, Sakai, Osaka (JP)

(72) Inventors: Hirotoshi Yasunaga, Sakai (JP); Hisashi Watanabe, Sakai (JP); Youzou Kyoukane, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/088,461

(22) PCT Filed: Mar. 22, 2017

(86) PCT No.: PCT/JP2017/011351
§ 371 (c)(1),
(2) Date: Sep. 26, 2018

(87) PCT Pub. No.: WO2017/170017
PCT Pub. Date: Oct. 5, 2017

(65) Prior Publication Data
US 2019/0086604 A1 Mar. 21, 2019

(30) Foreign Application Priority Data
Mar. 29, 2016 (JP) ................................. 2016-065435

(51) Int. Cl.
*F21V 8/00* (2006.01)
*G02B 6/00* (2006.01)
*G02F 1/1335* (2006.01)

(52) U.S. Cl.
CPC ............ *G02B 6/0061* (2013.01); *G02B 6/00* (2013.01); *G02B 6/0038* (2013.01);
(Continued)

(58) Field of Classification Search
CPC ....... G02B 6/0011–0063; G02F 1/1336; G02F 1/133615
See application file for complete search history.

(56) References Cited

U.S. PATENT DOCUMENTS 6,079,839 A * 6/2000 Leibe .................. G02B 6/0018
362/298
8,253,883 B2 8/2012 Mimura
(Continued)

FOREIGN PATENT DOCUMENTS

WO 2007/132574 A1 11/2007

*Primary Examiner* — Mariceli Santiago
(74) *Attorney, Agent, or Firm* — Keating & Bennett, LLP

(57) ABSTRACT

A backlight unit includes an LED, a light guide plate, a light collecting portion, an opposite end portion, and a total reflection regulator. The light guide plate includes a light entering end surface opposed to the LED and a light exiting surface that is one of plate surfaces. The light collecting portion includes light collecting pieces extending on the light exiting surface in a normal direction to the light entering end surface and arrayed in an orthogonal direction perpendicular to the normal direction. The opposite end portion is on an opposite side from the light entering end surface. A section of the opposite end portion includes a curved end surface. The total reflection regulator is disposed on at least a portion of the curved end surface and configured to regulate the amount of light in the opposite end portion to be totally reflected by the curved end surface.

11 Claims, 22 Drawing Sheets

(52) U.S. Cl.
CPC ......... *G02B 6/0055* (2013.01); *G02B 6/0088* (2013.01); *G02F 1/133615* (2013.01); *G02F 1/133524* (2013.01)

(56) References Cited

U.S. PATENT DOCUMENTS

| | | | |
|---|---|---|---|
| 9,377,174 B2 * | 6/2016 | Watanabe | G02F 1/133308 |
| 2009/0115933 A1 | 5/2009 | Mimura | |
| 2017/0293067 A1 * | 10/2017 | Watanabe | G02B 6/0033 |
| 2018/0156964 A1 * | 6/2018 | Song | G02B 6/0045 |
| 2018/0210279 A1 * | 7/2018 | Baek | G02F 1/133602 |

\* cited by examiner

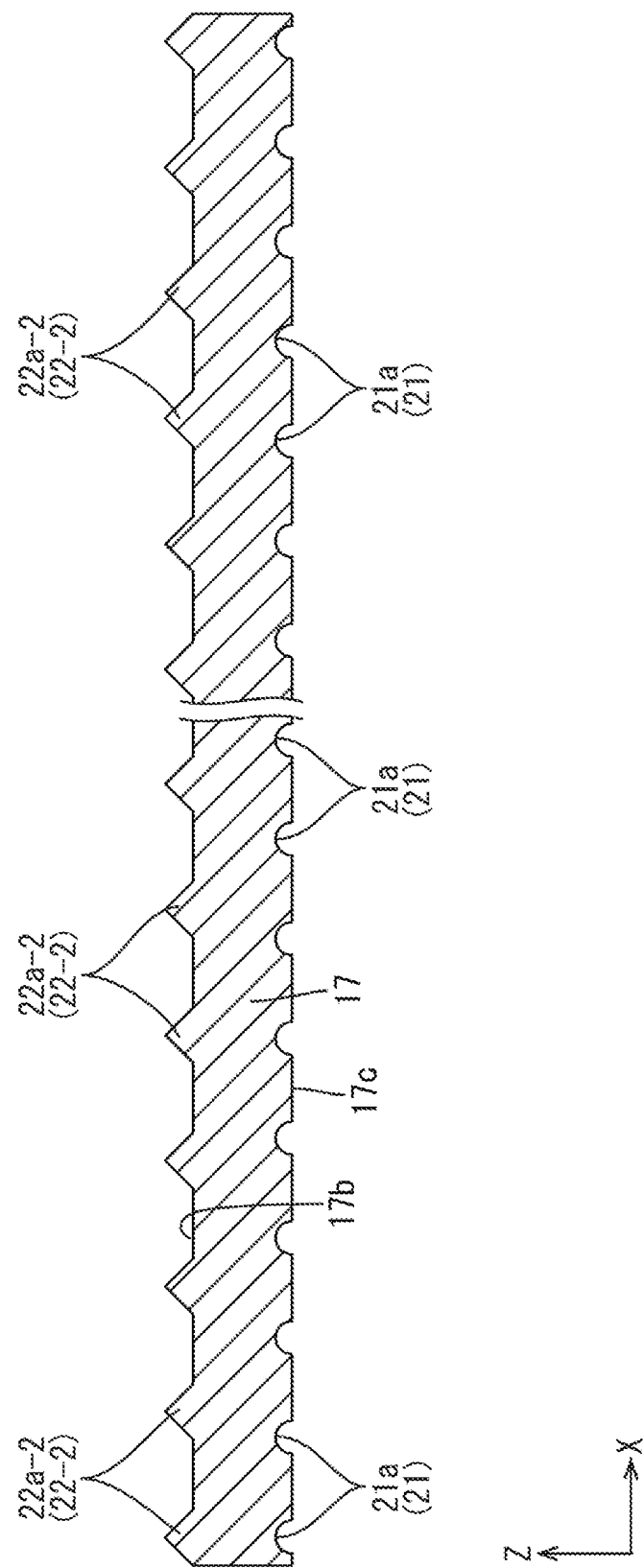

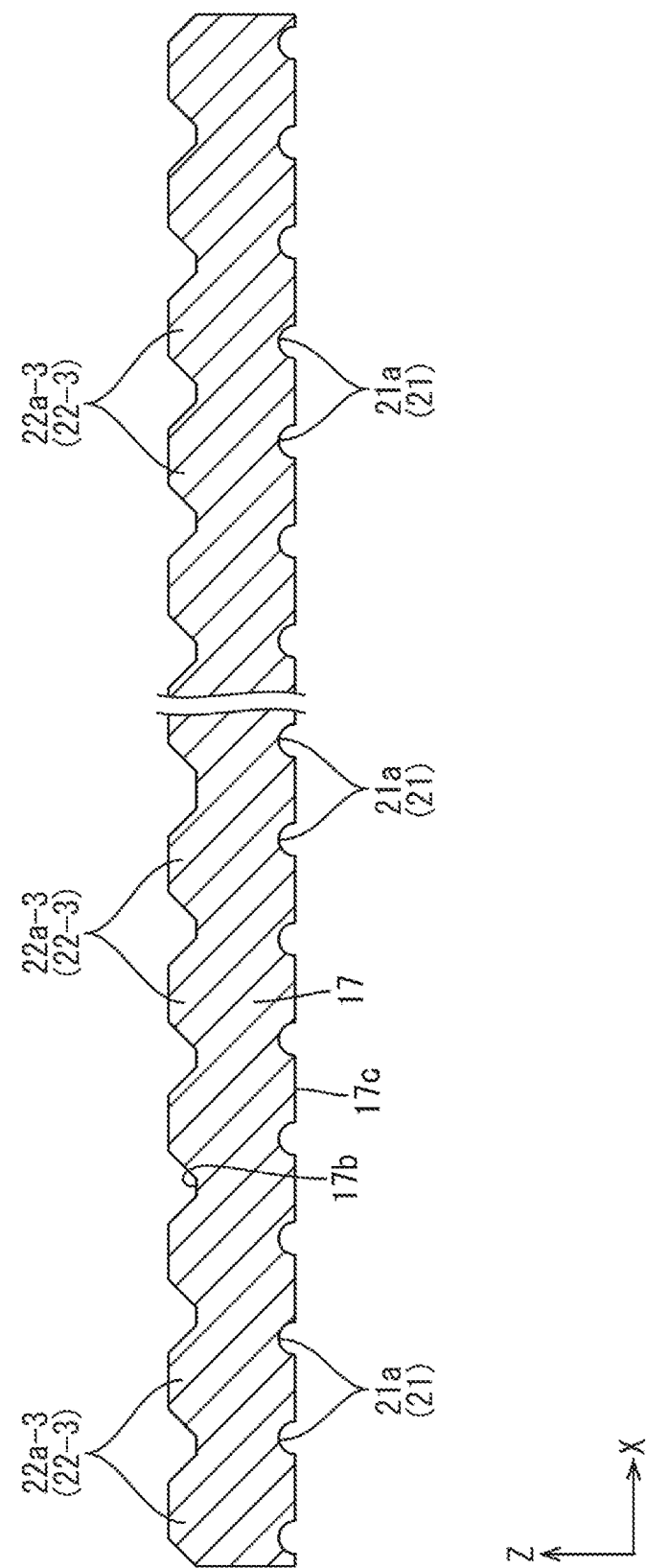

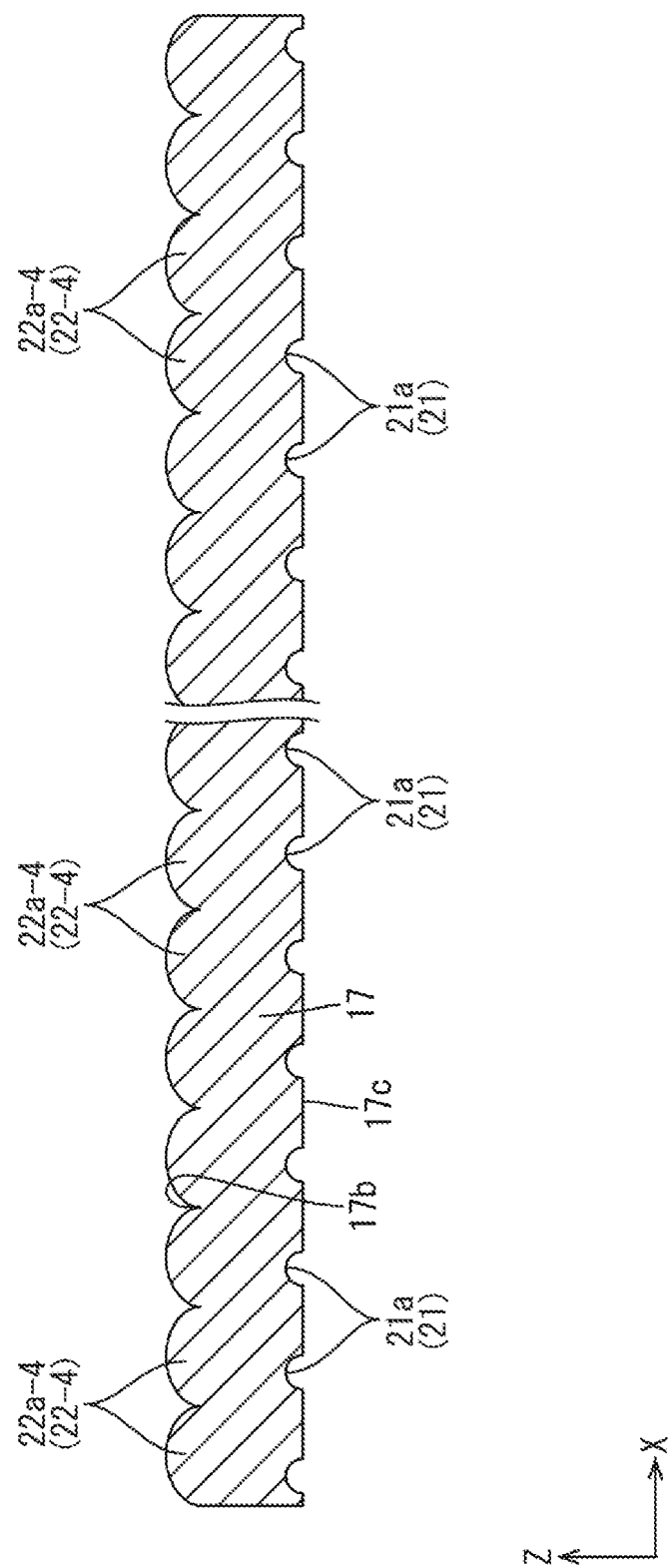

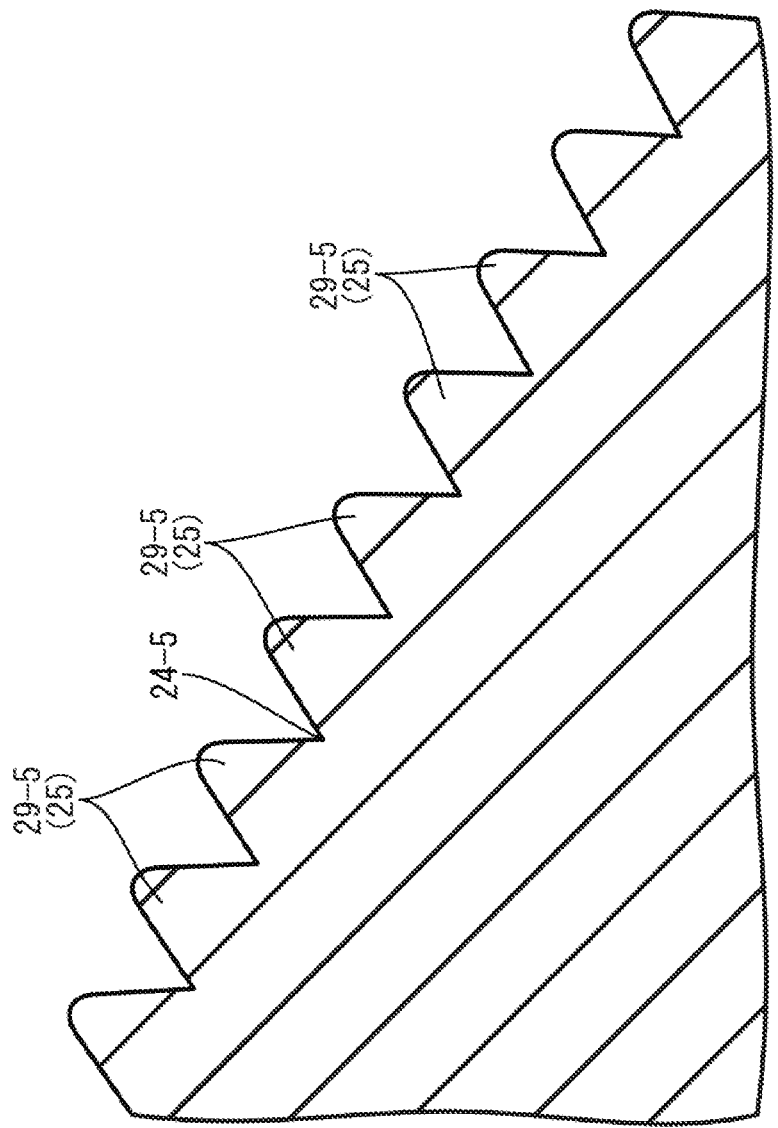

LIGHTING UNIT AND DISPLAY DEVICE

TECHNICAL FIELD

The present invention relates to a lighting unit and a display device.

BACKGROUND ART

A liquid crystal display device described in Patent Document 1 below has been known as one example of a conventional liquid crystal display device. The liquid crystal display device described in Patent Document 1 includes a liquid crystal panel including a light-blocking member having a curved portion, which has a curved planar shape, and pixels in a display region on which an image is displayed. The light-blocking curved portion blocks some of the light traveling toward the pixels such that the display region has a curved outer shape.

RELATED ART DOCUMENT

Patent Document

Patent Document 1: WO No. 2007-132574

Problem to be Solved by the Invention

A backlight unit for applying light to a liquid crystal panel having the curved outer shape, which is described in Patent Document 1, may be desired to have a curved light output area corresponding to the outer shape of the liquid crystal panel in order to have a good appearance. However, the backlight unit having such a configuration may generate a local bright portion where outgoing light concentrates due to the curved light output area.

DISCLOSURE OF THE PRESENT INVENTION

The present invention was made in view of the above circumstance and an object thereof is to reduce brightness unevenness.

Means for Solving the Problem

A lighting unit according to the invention includes a light source, a light guide plate, a light collecting portion, an opposite end portion, and a total reflection regulator. The light guide plate includes a light entering end surface opposed to the light source and through which light enters and a light exiting surface that is one of two plate surfaces and through which the light exits. The light collecting portion includes light collecting pieces extending on the light exiting surface in a normal direction with respect to the light entering end surface and arrayed in an orthogonal direction perpendicular to the normal direction. The opposite end portion included in the light guide plate is on an opposite side from the light entering end surface. At least a section of the opposite end portion includes a curved end surface having an edge that is curved in a plan view. The total reflection regulator is disposed on at least a portion of the curved end surface and configured to regulate an amount of light in the opposite end portion to be totally reflected by the curved end surface.

In this configuration, the light emitted by the light sources enters the light guide plate through the light entering end surface, travels in the light guide plate, and exits through the light exiting surface. The light that has traveled in the light guide plate to the light exiting surface is encouraged to exit by the light collecting pieces included in the light collecting portion. The light collecting effect is selectively applied to the outgoing light in the arrangement direction of the light collecting pieces, i.e., the orthogonal direction perpendicular to the normal direction with respect to the light entering end surface. Here, the light in the light guide plate, which has been applied to the light entering end surface, travels in the normal direction with respect to the light entering end surface toward the opposite end portion and may be totally reflected, at the opposite end portion, by the curved end surface having the curved edge. Since the light is totally reflected at a reflection angle corresponding to the incident angle with respect to the curved end surface, the light travels in the direction intersecting with (perpendicular to) the normal direction with respect to the light entering end surface. If the reflected light traveling in the direction intersecting with (perpendicular to) the normal direction with respect to the light entering end surface has reached the light exiting surface of the opposite end portion, the output of the light is encouraged by the light collecting pieces (light collecting portion) extending in the normal direction with respect to the light entering end surface. This may make the opposite end portion to have a local bright portion. To solve the problem, the total reflection regulator, which is configured to regulate the amount of light in the opposite end portion to be totally reflected by the curved end surface, is disposed over at least a portion of the curved end surface of the opposite end portion. This reduces the amount of light in the opposite end portion to be totally reflected by the curved end surface in the direction intersecting with (perpendicular to) the normal direction with respect to the light entering end surface. Thus, the possibility that the light collecting pieces will excessively increase the amount of light exiting through the light exiting surface of the opposite end portion is reduced and a local bright portion is unlikely to be generated. Thus, uneven brightness in the outgoing light is reduced.

The following configurations are preferable as aspects of the invention.

(1) The curved end surface of the opposite end portion may have an arc-like planar shape having a constant radius of curvature. This configuration allows the light totally reflected by the curved end surface of the opposite end portion to be regularly directed. This allows the formation region of the total reflection regulator on the curved end surface, for example, to be readily designed.

(2) The total reflection regulator may be positioned at least in a region between a first intersection at which the curved end surface crosses the axis extending through a curvature center in the orthogonal direction and a second intersection at which the curved end surface crosses the straight line forming an interior angle of "90°−θ" with the axis in which "θ" is the critical angle of the light guide plate for air. If the light in the light guide plate is totally reflected in the region between the first intersection, at which the curved end surface crosses the axis extending through the curvature center in the orthogonal direction, and the second intersection, at which the curved end surface crosses the straight line forming an interior angle of "90°−θ" with the axis, the amount of light exiting through the light exiting surface of the opposite end portion remarkably increases because the output of light is encouraged by the light collecting portion. The total reflection regulator disposed at least in the above region efficiently reduces the amount of light exiting through the light exiting surface of the opposite end portion, efficiently reducing the uneven brightness.

(3) The total reflection regulator may be disposed on the entire area of the curved end surface. This configuration more reliably prevents the uneven brightness.

(4) The total reflection regulator may include a light exiting surface side extended regulator extending to at least a portion of the light exiting surface of the opposite end portion. With this configuration, the light exiting surface side extended regulator regulates the total reflection of light at the light exiting surface of the opposite end portion. Thus, for example, the amount of light in the light guide plate totally reflected by the light exiting surface of the opposite end portion to the curved end surface is reduced while the light is traveling in the normal direction with respect to the light input surface. This reliably reduces the uneven brightness.

(5) The light guide plate may have a opposite plate surface that is the other of the two plate surfaces. The total reflection regulator may include a opposite plate surface side extended regulator extending to at least a portion of the opposite plate surface of the opposite end portion. With this configuration, the opposite plate surface side extended regulator regulates the total reflection of light at the opposite plate surface of the opposite end portion. Thus, for example, the amount of light in the light guide plate totally reflected by the opposite plate surface of the opposite end portion to the curved end surface is reduced while the light is traveling in the normal direction with respect to the light input surface. This more reliably reduces the uneven brightness.

(6) The lighting unit may include a frame having a frame-like shape and surrounding an outer peripheral surface of the light guide plate. The total reflection regulator may have a light reflectance lower than that of the frame. This configuration reduces the amount of light totally reflected by the curved end surface of the opposite end portion, compared with a configuration in which the frame is in contact with the curved end surface of the opposite end portion without the total reflection regulator. Thus, the uneven brightness is reduced.

(7) The total reflection regulator may include a base extending along the curved end surface and fixing layers on both surfaces of the base. The fixing layers are fixed to the light guide plate and the frame. The surfaces of the base each may have a reflectance lower than that of the frame. In this configuration, the fixing layers on the both surfaces of the base of the total reflection regulator are fixed to the curved end surface of the light guide plate and the frame, and thus the total reflection regulator is fixed to the light guide plate and the frame. In this configuration, regardless of which surface of the base of the total reflection regulator faces the light guide plate, the surface facing the light guide plate has a lower light reflectance than the frame. This configuration makes the installation of the total reflection regulator easy.

(8) The total reflection regulator may be configured to scatter and reflect the light that has reached the curved end surface in the light guide plate. This configuration improves the light use efficiency compared with a configuration in which the total reflection regulator absorbs a large amount of the light to regulate the total reflection at the curved end surface, reducing the possibility that the brightness will decrease at a portion around the curved end surface.

(9) The total reflection regulator may be formed of protrusions or recesses in the curved end surface. This configuration has high light use efficiency than that in the configuration in which the light is scattered and reflected to regulate the total reflection at the curved end surface. Thus, this configuration more reliably reduces a decrease in brightness, possibly caused at a portion around the curved end surface.

Next, to solve the above problems, a display device according to the present invention includes the above-described lighting unit and a display panel configured to display an image by using light from the lighting unit. The display device having such a configuration has high display quality, because the lighting unit configured to apply light to the display panel is unlikely to have uneven brightness.

Advantageous Effect of the Invention

The present invention reduces uneven brightness.

BRIEF DESCRIPTION OF THE DRAWINGS

FIG. 19 is a cross-sectional view illustrating a backlight unit according to an embodiment (2) of the invention taken in a short-side direction.

FIG. 20 is a cross-sectional view illustrating a backlight unit according to an embodiment (3) of the invention taken in a short-side direction.

FIG. 21 is a cross-sectional view illustrating a backlight unit according to an embodiment (4) of the invention taken in a short-side direction.

FIG. 22 is a magnified cross-sectional view illustrating a total reflection regulator of a light guide plate included in a backlight unit according to an embodiment (5) of the invention.

MODE FOR CARRYING OUT THE INVENTION

First Embodiment

A first embodiment of the invention is described with reference to FIGS. 1 to 10. In this embodiment, a liquid crystal display device 10 is described as an example. The X axis, Y axis, and Z axis are indicated in some of the drawings, and each of the axes indicates the same direction in the respective drawings. The upper side in FIGS. 2, 3, and 6 is a front side and the lower side in FIGS. 2, 3, and 6 is a rear side.

Figure 1:
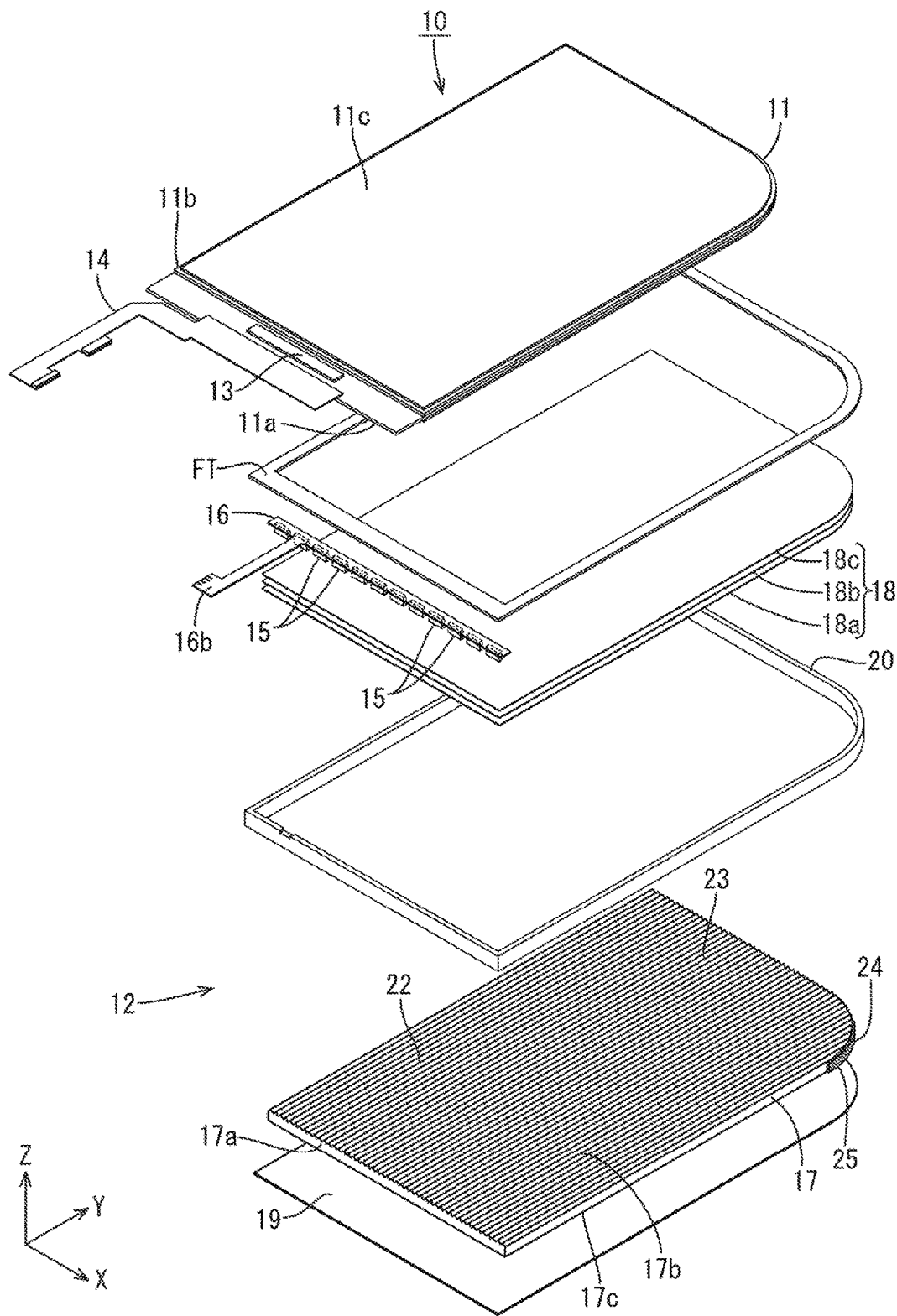
FIG. 1 is an exploded perspective view illustrating a liquid crystal display device according to a first embodiment of the invention.

As illustrated in FIG. 1, the liquid crystal display device 10 has a vertically-long substantially oblong overall shape. One of the corners at a first end of a long side (the right corner in FIG. 1) is rounded to have an arc-like outer shape. Components described below each have an outer shape reflecting the outer shape of the liquid crystal display device 10. The liquid crystal display device 10 at least includes a liquid crystal panel (display panel) 11 capable of displaying an image, a backlight unit (lighting unit) 12 on the rear side of the liquid crystal panel 11, and a fixation tape FT for fastening the liquid crystal panel 11 and the backlight unit 12 together. The backlight unit 12, which is an external light source, is configured to apply light to the liquid crystal panel 11 to display an image. The fixation tape FT has a vertically-long frame-like shape corresponding to the frame-like shape of the liquid crystal display device 10 (the non-display area of the liquid crystal panel 11) and is preferably a light-blocking double-sided tape including a light-blocking base coated with an adhesive on both sides. Furthermore, a frame-shaped bezel (not illustrated) is preferably disposed on the front side of the liquid crystal panel 11 such that an outer peripheral portion of the liquid crystal panel 11 is sandwiched between the bezel and the backlight unit 12. The bezel is preferably formed of a metal material, such as stainless steel and aluminum. In the liquid crystal display device 10 and the components having the same outer shapes as that of the liquid crystal display device 10, the long-side direction, the short-side direction, and the thickness direction respectively match the Y-axis direction, the X-axis direction, and the Z-axis direction in the drawings.

Figure 2:
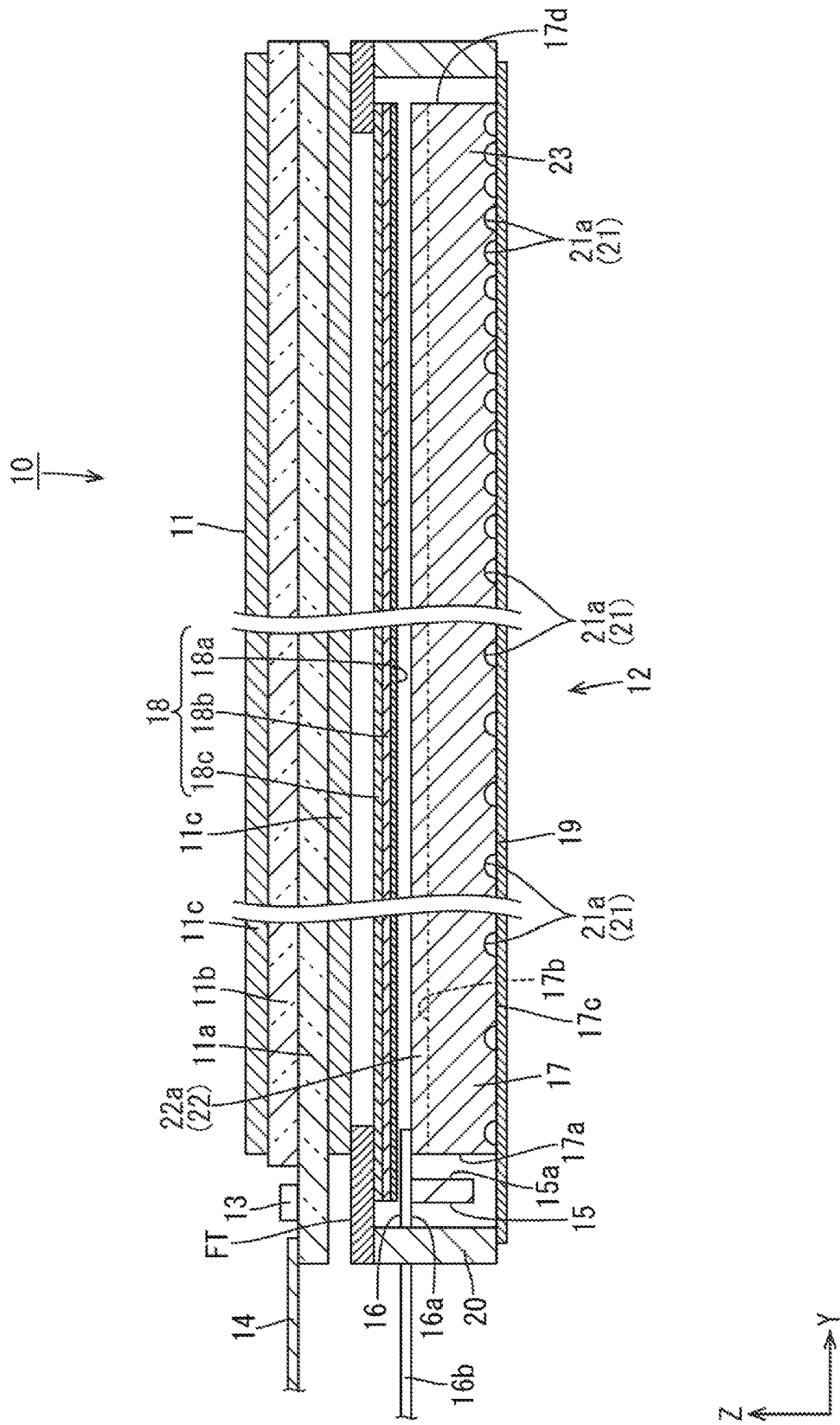
FIG. 2 is a cross-sectional view illustrating the liquid crystal display device taken in the long-side direction.
Figure 3:
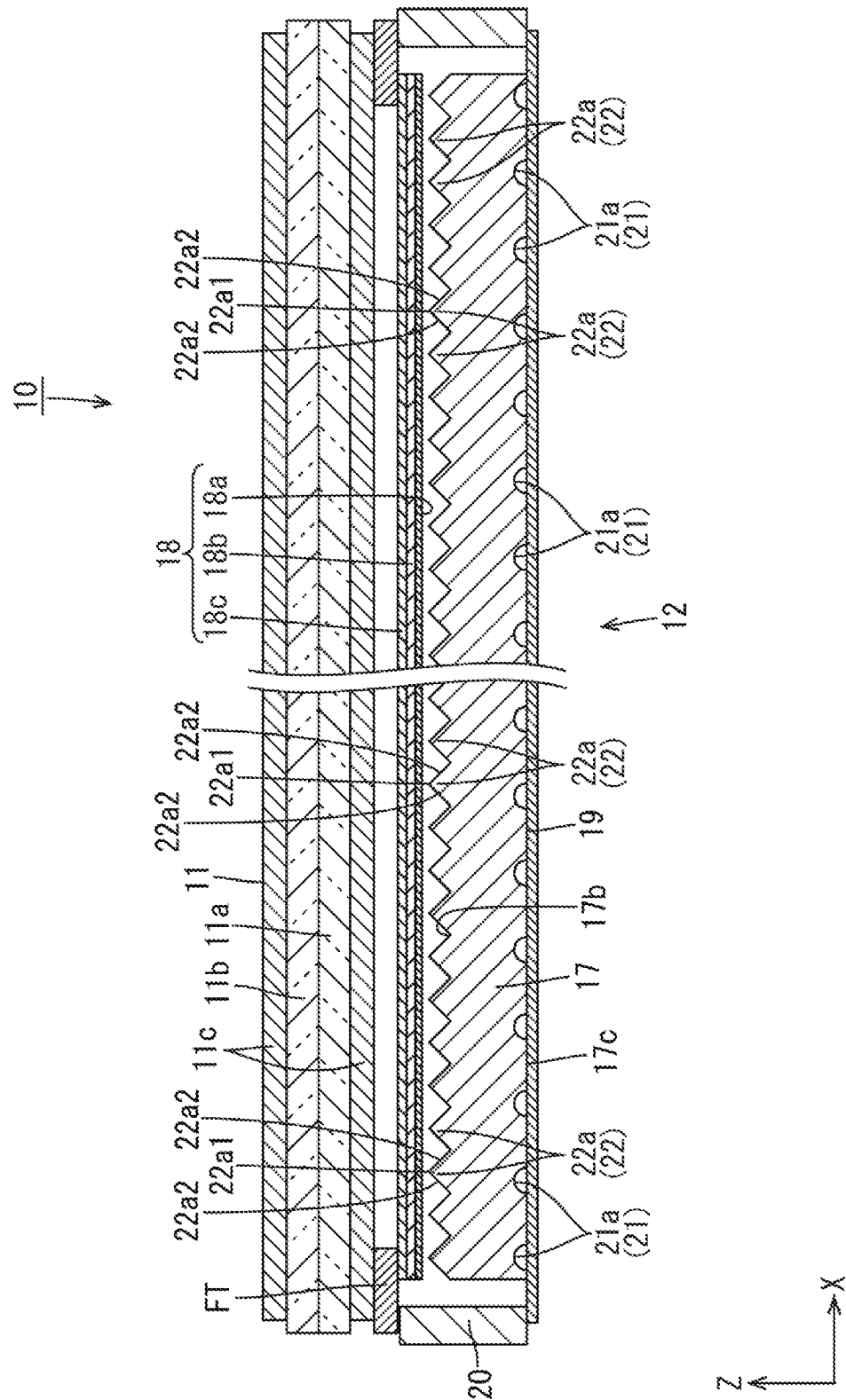
FIG. 3 is a cross-sectional view illustrating the liquid crystal display device taken in the short-side direction.

As illustrated in FIGS. 2 and 3, the liquid crystal panel 11 having one rounded corner as the liquid crystal display device 10 includes substantially transparent glass substrates 11a and 11b bonded together with a predetermined gap therebetween and liquid crystals sealed in the gap between the substrates 11a and 11b. One of the substrates 11a and 11b that is on the rear side is an array substrate 11a and the other on the front side is a CF substrate 11b. On the array substrate 11a, switching devices (such as TFTs) connected to source lines and gate lines, which are perpendicular to each other, pixel electrodes connected to the switching devices, and an alignment film, for example, are disposed. On the CF substrate 11b, a color filter having R (red), G (green), and B (blue) color portions, for example, in a predetermined arrangement, a common electrode and an alignment film, for example, are disposed. A flexible board 13 and a driver 14 are disposed on the array substrate 11a. Front and rear polarizing plates 11c are attached to outer surfaces of the substrates 11a and 11b.

As illustrated in FIG. 1, the backlight unit 12 having one rounded corner as the liquid crystal display device 10 at least includes light emitting diodes (LED) 15 as light sources, an LED board (light source board) 16 on which the LEDs 15 are mounted, a light guide plate 17 configured to guide light from the LEDs 15, an optical sheet (optical member) 18 disposed on the front side of the light guide plate 17, a reflective sheet (reflective member) 19 disposed on the rear surface of the light guide plate 17, and a frame 20 having a frame-like shape and collectively surrounding the components 15 to 19. The light guide plate 17, the optical sheet 18, the reflective sheet 19, and the frame 20 each have one rounded corner as the liquid crystal display device 10. The backlight unit 12 is a one-side edge-lighting (side-lighting) backlight unit in which the LEDs 15 (and the LED board 16) are locally disposed on a second end of the long side (end opposite the end including the rounded corner). In such an edge-lighting backlight unit, light is applied to the light guide plate 17 from only one side. Hereinafter, the components of the backlight unit 12 are described in sequence.

As illustrated in FIGS. 1 and 2, the LEDs 15 each include an LED chip sealed by using a sealing material on a base fixed to the LED board 16. The LED chips emit a single color of blue, for example. The LEDs 15 emit white color as a whole, because phosphors (a yellow phosphor, a green phosphor, and a red phosphor, for example) are dispersed in the sealing material. The LED 15 is a side-lighting LED having a light emitting surface 15a located adjacent to a surface attached to the LED board 16.

As illustrated in FIGS. 1 and 2, the LED board 16 has a horizontally-long oblong overall shape (in which the long-side direction matches the X-axis direction and the short-side direction matches the Y-axis direction). The LED board 16 has plate surfaces parallel with the plate surfaces of the light guide plate 17, for example. The rear plate surface of the LED board 16 is an LED mounting surface (light source mounting surface) 16a on which the LEDs 15 are mounted. The LED mounting surface 16a has a wiring pattern (not illustrated) for supplying power to the LEDs 15. The LEDs 15 are arranged with a space therebetween in the X-axis direction on the LED mounting surface 16a. The LED board 16 is disposed on the front side of the frame 20 and the light guide plate 17 to be located between the liquid crystal panel 11 and these two components. The LED board 16 has a leading wiring line 16b extending outwardly from the body (on which the LEDs 15 are mounted) beyond the edge of the frame 20.

The light guide plate 17 is formed of a substantially transparent synthetic resin material (an acrylic resin such as polymethyl methacrylate (PMMA) or a polycarbonate, for example). The light guide plate 17 has a refractive index sufficiently higher than that of air. Specifically described, a light guide plate 17 formed of an acrylic resin has a refractive index of about 1.49 and a light guide plate 17 formed of a polycarbonate has a refractive index of about 1.57. As illustrated in FIGS. 1 and 2, the light guide plate 17 is housed with the outer periphery thereof being surrounded by the frame 20 and disposed directly below the liquid crystal panel 11 and the optical sheet 18. The outer peripheral surface of the light guide plate 17 includes a light entering end surface (light source opposing surface) 17a, which is a left short-side surface in FIG. 2, and a light-input opposite end surface (light source non-opposing surface) 17d, which is a short side surface opposite the light entering end surface 17a (right side in FIG. 2). The light entering end surface 17a is opposed to the LEDs 15 and receives light from the LEDs 15. One of the front and rear plate surfaces of the light guide plate 17 that faces the front side (the liquid crystal panel 11) is a light exiting surface 17b through which light exits toward the liquid crystal panel 11 and the other that faces the rear side is a opposite plate surface 17c opposite the light exiting surface 17b. This configuration enables the light guide plate 17 to receive light that has been emitted by the LEDs 15 in the Y-axis direction through the light entering end surface 17a and to change the traveling direction of the light therein to the upward direction in the Z-axis direction such that the light exits through the light exiting surface 17b toward the optical sheet 18 (front side, light-exit side).

As illustrated in FIGS. 1 and 2, the optical sheet 18 is disposed between the liquid crystal panel 11 and the light guide plate 17 in the Z-axis direction with the plate surfaces parallel with the plate surfaces of the light guide plate 17 and other components. The optical sheet 18 provides predetermined optical properties to the outgoing light from the light guide plate 17 and allows the light to travel toward the liquid crystal panel 11. The optical sheet 18 includes multiple sheets (three sheets in this embodiment) stacked on top of one another. Specifically described, the optical sheet 18 includes a diffusing sheet 18a, a first prism sheet 18b, and a second prism sheet 18c in this order from the rear side. The extending direction of prism in the first prism sheet 18b and that in the second prism sheet 18c are preferably perpendicular to each other. The adhesive on the rear surface of the fixing tape FT is adhered to the front outer peripheral portion of the second prism sheet 18c, which is the top layer. Non-limiting preferred examples of the diffusing sheet 18a include "D114" available from TSUJIDEN Co., Ltd. Non-limiting preferred examples of the first and second prism sheets 18b and 18c include "BEF series" available from 3M Japan Limited.

As illustrated in FIGS. 1 and 2, the reflective sheet 19 has a plate surface parallel with the plate surfaces of the light guide plate 17, for example, and covers the opposite plate surface 17c of the light guide plate 17. The reflective sheet 19 has high light reflectivity and efficiently reflects the light leaked through the opposite plate surface 17c of the light guide plate 17 toward the front side (light exiting surface 17b). The reflective sheet 19 is slightly larger than the light guide plate 17 and has a long-side end portion protruding beyond the light entering end surface 17a toward the side of the LEDs 15. The reflective sheet 19 is preferably fixed to the frame 20 with a double-sided tape (not illustrated), for example. Non-limiting preferred examples of the reflective sheet 19 include "ESR" available from 3M Japan Limited.

The frame 20 is formed of a synthetic resin (polycarbonate, for example) to have a white surface, which is excellent in reflectivity. As illustrated in FIGS. 1 and 2, the frame 20 has a frame-like shape slightly larger than the light guide plate 17. The frame 20 collectively surrounds the LEDs 15 and the light guide plate 17. The adhesive on the rear surface of the above-described fixing tape FT, which has light blocking properties, is adhered to the front surface of the frame 20. The frame 20 is fixed to the liquid crystal panel 11 by the fixing tape FT.

Here, the light guide plate 17 is described in detail. As illustrated in FIG. 2, the opposite plate surface 17c of the light guide plate 17 includes an outgoing light reflective portion 21 configured to reflect light traveling in the light guide plate 17 such that the light exits through the light exiting surface 17b. The outgoing light reflective portion 21 includes multiple reflective pieces (grainy pattern) 21a that are recesses in the opposite plate surface 17c. The distribution density of the reflective pieces 21a changes with the distance from the light entering end surface 17a (LEDs 15). The distribution density of the reflective pieces 21a included in the outgoing light reflective portion 21 tends to increase as the distance from the light entering end surface 17a increases in the Y-axis direction and tends to decrease as the distance from the light entering end surface 17a decreases. This enables the outgoing light through the light exiting surface 17b to be substantially evenly distributed in plane. The reflective pieces 21a distributed as above may be obtained through injection molding of the light guide plate 17, for example. In such a case, multiple protrusions on a surface for forming the opposite plate surface 17c are transferred from the molding die (not illustrated) to form the reflective pieces 21a.

As illustrated in FIG. 3, the light exiting surface 17b of the light guide plate 17 has a light collecting portion (prism portion) 22 configured to apply light collecting effect (anisotropic light collecting effect) to the outgoing light. The light collecting portion 22 includes multiple light collecting pieces (prism pieces) 22a protruding from the light exiting surface 17b toward the front side (toward the optical sheet 18) in the Z-axis direction. The light collecting pieces 22a each have a mountain-like cross-sectional shape when taken in the X-axis direction (orthogonal direction perpendicular to the normal direction with respect to the light entering end surface 17a) and extend substantially in a straight line in the Y-axis direction (normal direction with respect to the light entering end surface 17a). The light collecting pieces 22a are arranged on the light exiting surface 17b in the X-axis direction with substantially no space therebetween. The light collecting pieces 22a each have a triangular cross-sectional shape and have two inclined surfaces 22a2 with a top 22a1 therebetween. The light collecting piece 22a having such a configuration allows the light traveled through the light guide plate 17 to be refracted by an interface between the inclined surface 22a2 of the light collecting piece 22a and the external air layer such that the light is reflected in the frontward direction (normal direction with respect to the light exiting surface 17b, Z-axis direction). The light collecting effect is applied to the light applied to the light collecting pieces 22a in the X-axis direction but is hardly applied to the light applied to the light collecting pieces 22a in the Y-axis direction, which is perpendicular to the X-axis direction. Thus, in the light collecting portion 22 according to this embodiment, the X-axis direction in which the light collecting pieces 22a are arranged is a light collection direction that allows the light collecting effect to be applied to the light and the Y-axis direction in which the light collecting pieces 22a extend is a light non-collection direction that hardly allow the light collecting effect to be applied to the light. Furthermore, since the light collecting piece 22a has the two inclined surfaces 22a2, the light that has traveled through the light guide plate 17 to the light exiting surface 17b is likely to have an incident angle with respect to the inclined surface 22a2 not greater than the critical angle. Such light is able to exit through the light exiting surface 17b. In other words, the light collecting pieces 22a included in the light collecting portion 22 also has a function of encouraging the output of the light that has traveled to the light exiting surface 17b. The apex angle of each of the light collecting pieces 22a is preferably about 90° and the arrangement pitch of the light collecting pieces 22a is preferably about 30 µm. However, the apex angle and the arraignment pitch are not limited to the above values.

Figure 4:
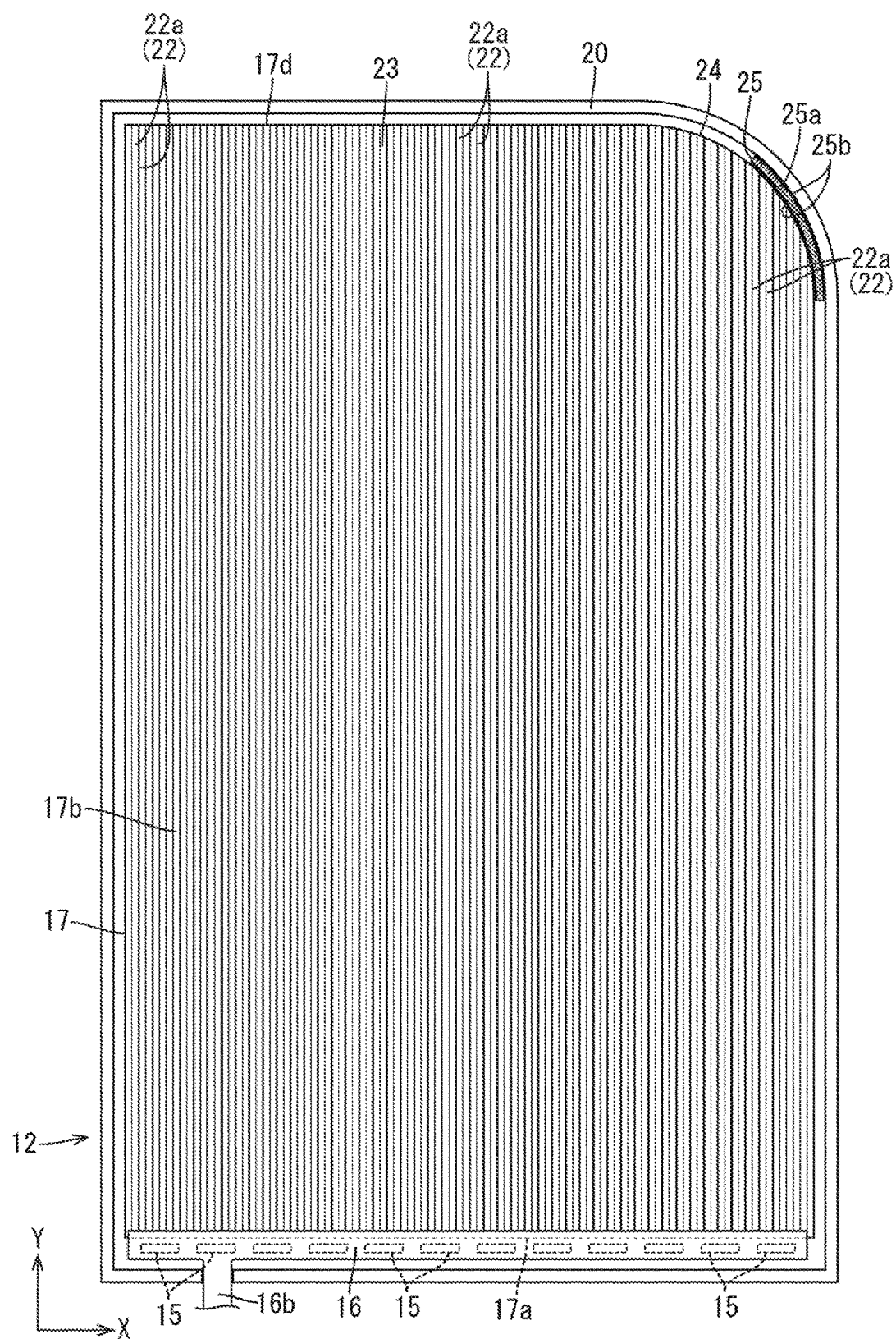
FIG. 4 is a plan view illustrating a backlight unit included in the liquid crystal display device.
Figure 7:
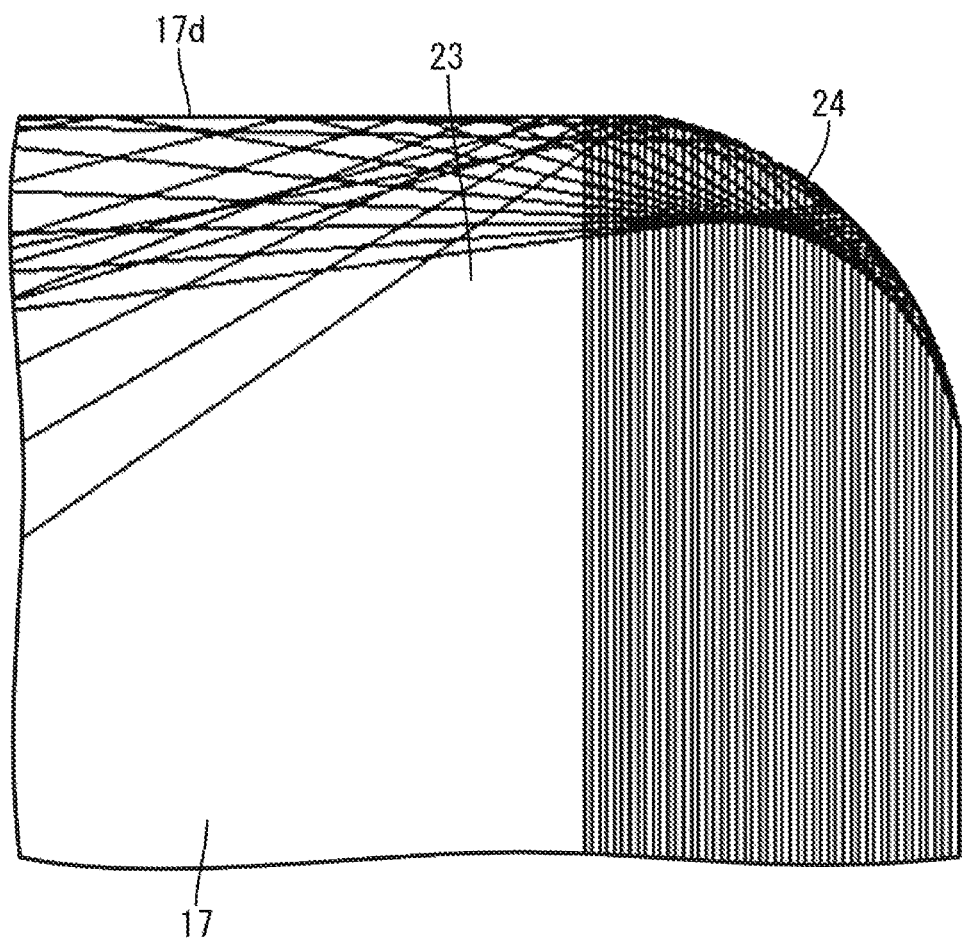
FIG. 7 is a plan view illustrating a light guide plate indicating the result of ray tracing of light traveling in the light guide plate.

As illustrated in FIG. 4, the light guide plate 17 has a opposite end portion 23 at a side opposite the light entering end surface 17a (adjacent to the LEDs 15). One of the two corners of the opposite end portion 23 (the right corner in FIG. 4) is rounded in an arc-like shape along the outer shape of the backlight unit 12, and thus a portion of the outer peripheral surface is a curved end surface 24. The curved end surface 24 has an arc-like shape having a constant radius of curvature (about 5 mm, for example) in plan view and the central angle thereof is about 90°. The curved end surface 24 is located at the same position in the X-axis direction as the LED 15 at the right end in FIG. 4. The light from the LEDs 15 that has entered the light guide plate 17 through the light entering end surface 17a travels in the light guide plate 17 in the Y-axis direction in a substantially straight line and some of the light that has traveled to the curved end surface 24 may be totally reflected by the curved end surface 24 of the opposite end portion 23. As indicated in FIG. 7, the light totally reflected by the curved end surface 24 is reflected at a reflection angle corresponding to the incident angle with respect to the curved end surface 24. Thus, the reflection light travels in a diagonal direction intersecting with the Y-axis direction or in a substantially X-axis direction (orthogonal direction perpendicular to the normal direction). Thus, the light traveling in the opposite end portion 23 includes, in addition to the light traveling in the Y-axis direction, the reflection light traveling in the diagonal direction intersecting with the Y-axis direction and the reflection light traveling in the substantially X-axis direction. The amount of light traveled to the light exiting surface 17b of the opposite end portion 23 is larger than the amount of light traveled to the remaining portion of the light exiting surface 17b. The reflection light traveling in the diagonal direction and the reflection light traveling in the substantially X-axis direction in the opposite end portion 23 may be applied to the light collecting portion 22. In such a case, the reflection light is applied to the inclined surfaces 22a2 of the light collecting piece 22a at an incident angle not exceeding the critical angle. Thus, the reflection light may travel frontward to the outside, generating a local bright portion around the curved end surface 24. The local bright portion is generated because the reflection light traveling in the diagonal direction and the reflection light traveling in the substantially X-axis direction is applied to the light collecting portion 22 extending in the Y-axis direction.

Figure 5:
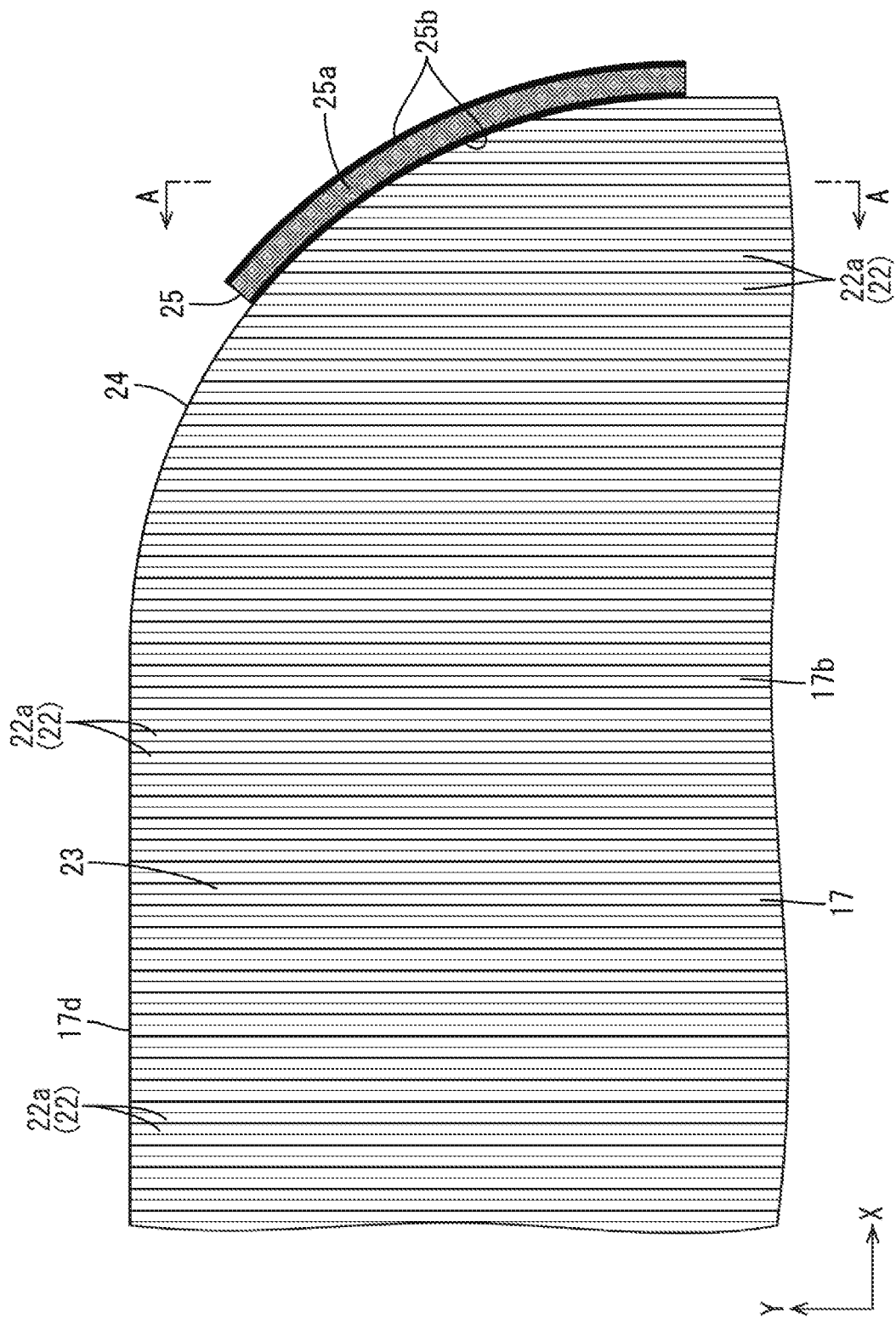
FIG. 5 is a plan view illustrating an opposite end portion and its neighboring portion of a light guide plate included in the backlight unit.
Figure 6:
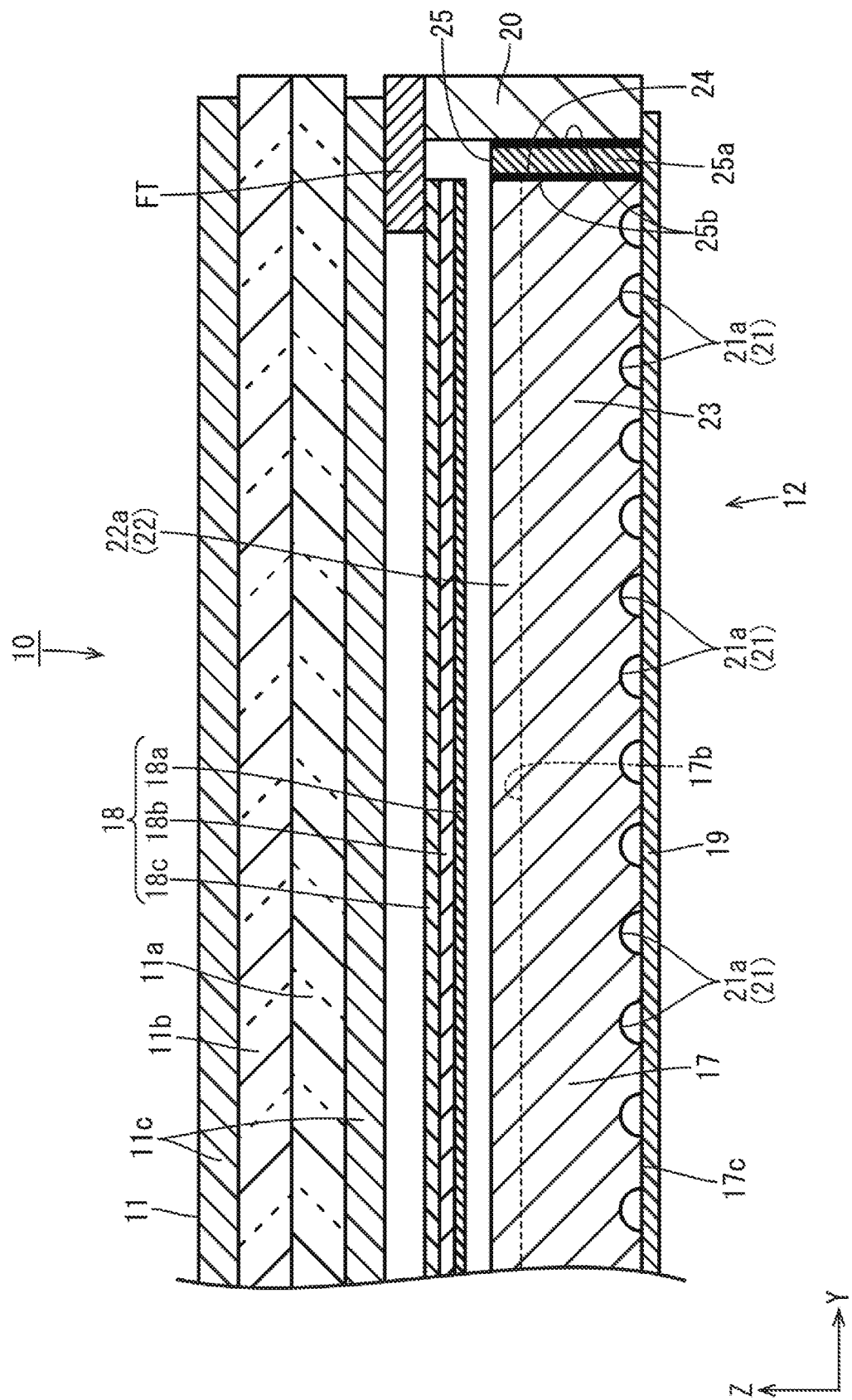
FIG. 6 is a cross-sectional view taken along line A-A in FIG. 5.

To solve the problem, as illustrated in FIGS. 5 and 6, the light guide plate 17 according to the embodiment includes a total reflection regulator 25 disposed on at least a portion of the curved end surface 24 and configured to regulate the amount of light in the opposite end portion 23 totally reflected by the curved end surface 24. The total reflection regulator 25 disposed on at least a portion of the curved end surface 24 reduces the amount of light totally reflected by the curved end surface 24 in the diagonal direction intersecting with the Y-axis direction (normal direction with respect to the light entering end surface 17a) and the X-axis direction perpendicular to the Y-axis direction (orthogonal direction) in the opposite end portion 23. This reduces the possibility that the light collecting pieces 22a of the light collecting portion 22 will excessively increase the amount of light exiting through the light exiting surface 17b of the opposite end portion 23 and generate a local bright portion. Thus, the uneven brightness of the outgoing light is reduced. Furthermore, since the curved end surface 24 of the opposite end portion 23 has an arc-like shape having a constant radius of curvature, the light totally reflected by the curved end surface 24 is regularly directed. This allows the formation region of the total reflection regulator 25 on the curved end surface 24, for example, to be readily designed.

At least the surface of the total reflection regulator 25 facing the light guide plate 17 is black, which is excellent in light absorption, and the light reflectance thereof is lower than that of the front surface of the frame 20. In a configuration not including the total reflection regulator, the frame 20 may be in contact with the curved end surface 24 of the opposite end portion 23. Compared with such a configuration, a large amount of the light that has traveled in the light guide plate 17 to the curved end surface 24 of the opposite end portion 23 is efficiently absorbed by the total reflection regulator 25, since, as described above, the total reflection regulator 25 has a lower light reflectance than the frame 20, reducing the amount of light totally reflected by the curved end surface 24. Thus, uneven brightness is efficiently reduced. Specifically described, as illustrated in FIG. 6, the total reflection regulator 25 includes a base 25a extending along the curved end surface 24 and fixing layers 25b on both surfaces of the base 25a. The fixing layers 25b are fixed to the light guide plate 17 and the frame 20. The light reflectance of the surfaces of the base 25a are lower than that of the frame 20. In this configuration, the fixing layers 25b on the both surfaces of the base 25a of the total reflection regulator 25 are fixed to the curved end surface 24 of the light guide plate 17 and the frame 20, and thus the total reflection regulator 25 is fixed to the light guide plate 17 and the frame 20. In this configuration, regardless of which surface of the base 25a of the total reflection regulator 25 faces the light guide plate 17, the surface facing the light guide plate 17 has a lower light reflectance than the frame 20. This configuration makes the installation of the total reflection regulator 25 easy.

Figure 8:
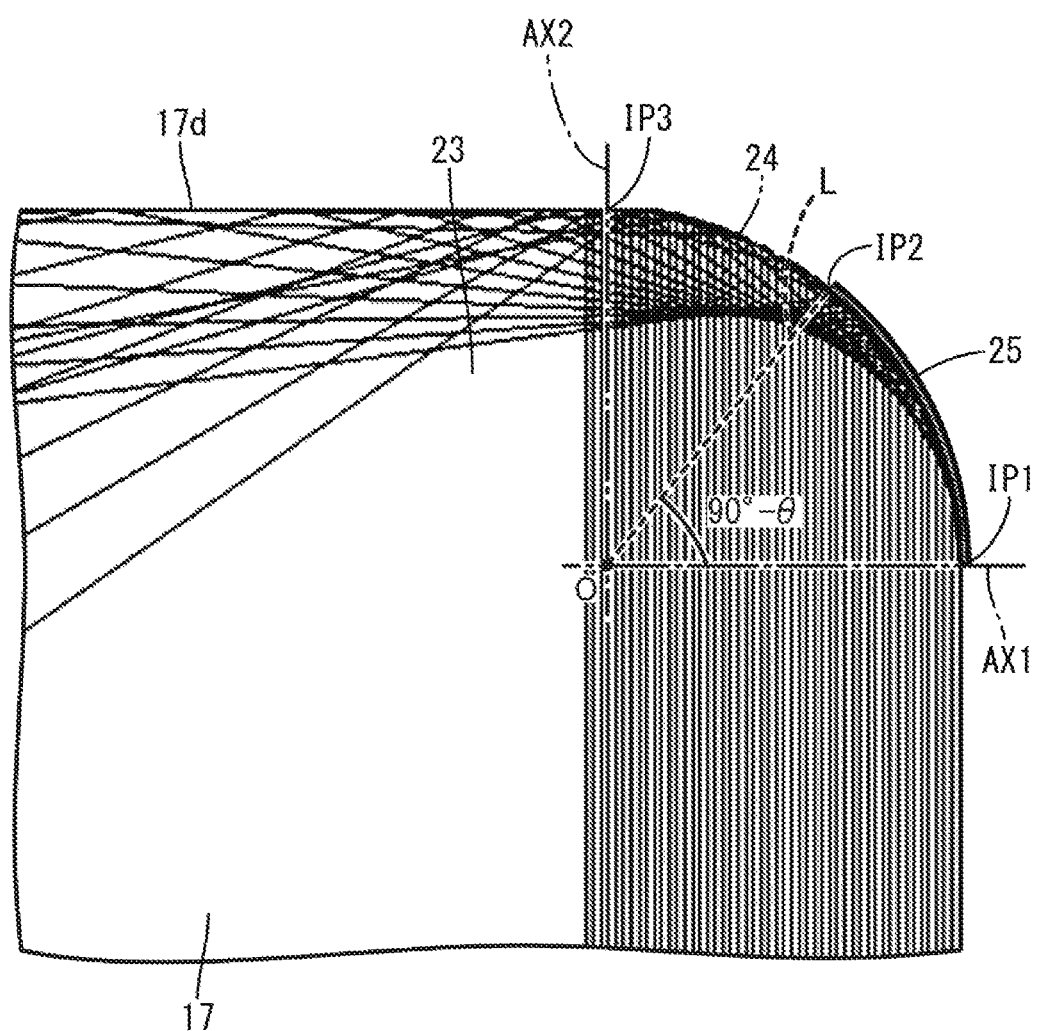
FIG. 8 is a plan view illustrating the light guide plate and indicating a design method of a total reflection regulator.

The formation region of the total reflection regulator 25 on the curved end surface 24 of the opposite end portion 23 is determined as below. The critical angle of the light guide plate 17 for air is defined as "θ". The critical angle "θ" of the light guide plate 17 is "arc sin (1/n)" in which "n" is a refractive index of the light guide plate 17. Specifically described, if the light guide plate 17 is formed of an acrylic resin, "n=1.49" and "θ=about 42.2°". If the light guide plate 17 is formed of a polycarbonate, "n=1.57" and "θ=39.6°". As illustrated in FIG. 8, the curvature center of the curved end surface 24 is "O", the axis extending through the curvature center O in the orthogonal direction (X-axis direction), which is perpendicular to the normal direction (Y-axis direction) of the light entering end surface 17a, is "AX1", and the straight line forming an interior angle of "90°−θ" with the axis AX1 is "L". The total reflection regulator 25 is selectively disposed in the region between an intersection IP1, at which the curved end surface 24 crosses the axis AX1, and an intersection IP2, at which the curved end surface 24 crosses the straight line L. Specifically described, when the light guide plate 17 is formed of an acrylic resin, the interior angle between the straight-line L and the axis AX1 is about "47.8°" and, when the light guide plate 17 is formed of a polycarbonate, the interior angle is about "50.4°". The total reflection regulator 25 is formed over a half or more of the region of the curved end surface 24 at a side adjacent to the end in the X-axis direction. In FIG. 8, in addition to the result of ray tracing in FIG. 7, the axis AX1 is indicated by a one-dot chain line and the straight line L is indicated by a broken line. In the region of the curved end surface 24 (region between the intersection IP1 and the intersection IP2), the light traveling through the light guide plate 17 in the Y-axis direction may be totally reflected. In such a case, the amount of light exiting through the light exiting surface 17b of the opposite end portion 23 tends to be particularly large because the output of the light is encouraged by the light collecting portion 22 at the opposite end portion 23. To overcome the problem, the total reflection regulator 25 is disposed on the curved end surface 24 over the above region to efficiently reduce the amount of light exiting through the light exiting surface 17b of the opposite end portion 23. In other words, the light that may form the bright portion is efficiently absorbed by the total reflection regulator 25 and the light that does not form or is unlikely to form the bright portion is not absorbed by the total reflection regulator 25. Thus, a reduction in the brightness due to the presence of the total reflection regulator 25 is minimized and the uneven brightness is efficiently reduced. Furthermore, the total reflection regulator 25 extends over the entire width of the curved end surface 24 in the Z-axis direction (normal direction with respect to the light exiting surface 17b, thickness direction of the light guide plate 17).

Figure 9:
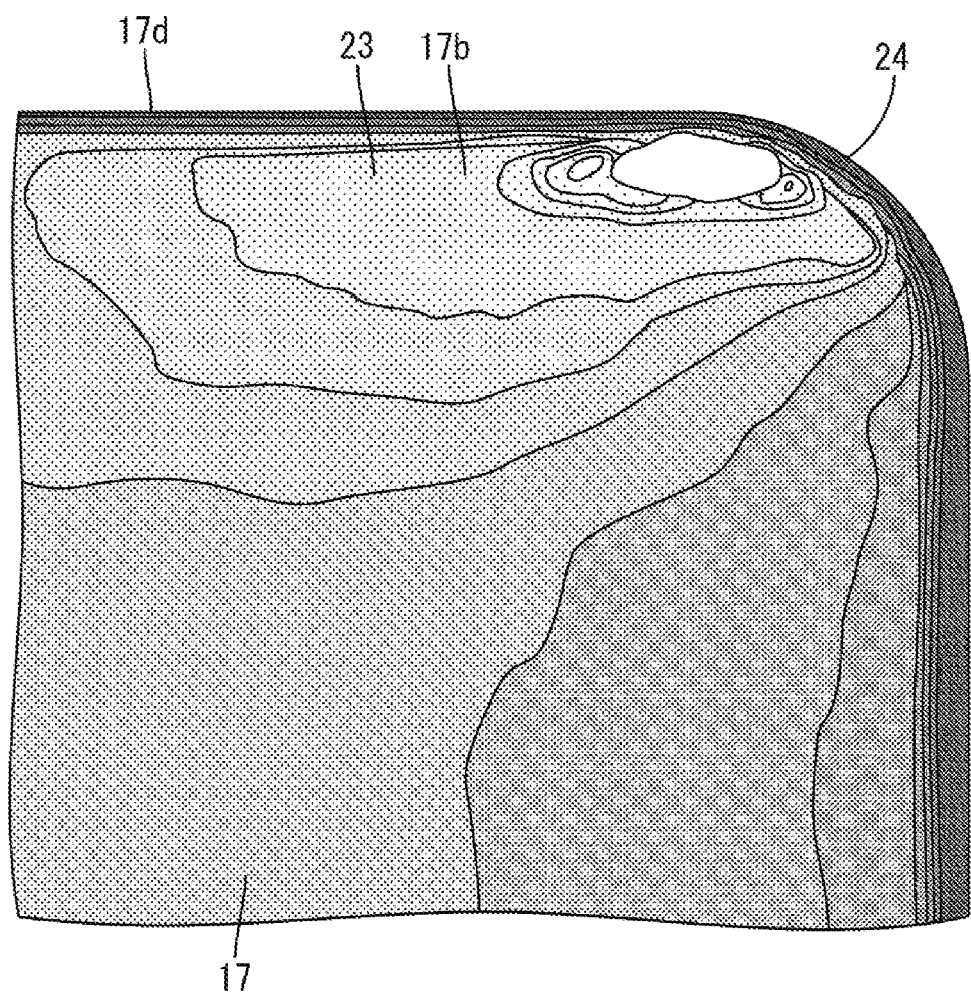
FIG. 9 is a photograph indicating an experimental result of the example in the comparative experiment.
Figure 10:
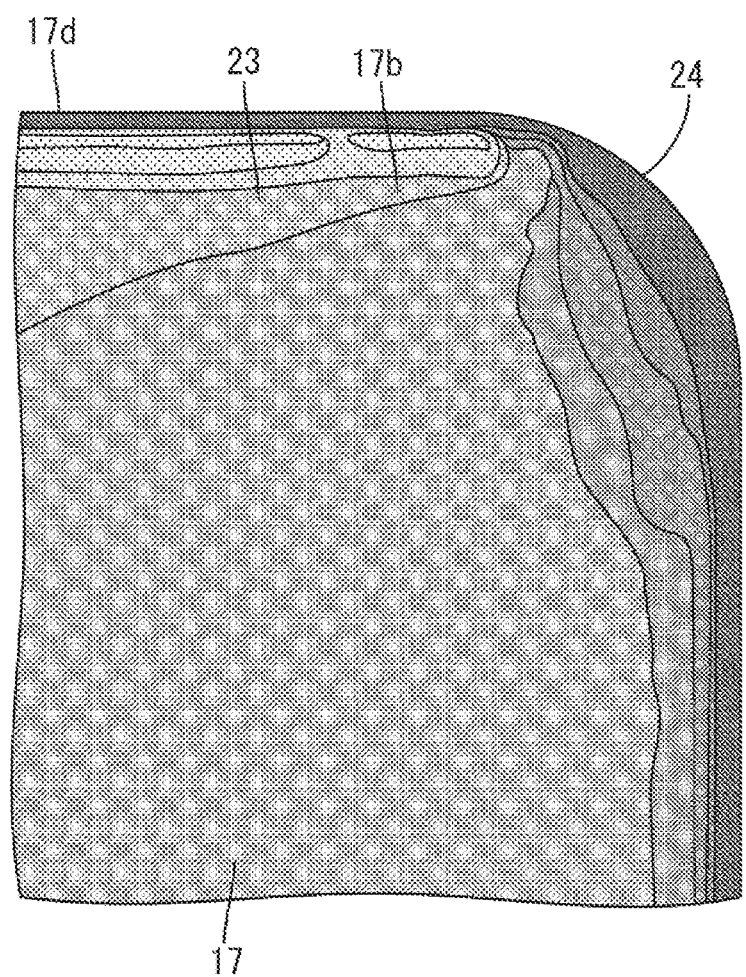
FIG. 10 is a photograph indicating an experimental result of the example in the comparative experiment.

The following comparative experiment was performed to demonstrate the above-described operation and effect. In the comparative experiment, a backlight unit including a light guide plate not having the total reflection regulator 25 on the curved end surface 24 was used as a comparative example and a backlight unit 12 including the light guide plate 17 described above was used as an example. The backlight unit of the comparative example is substantially the same as the backlight unit 12 of the example, except for the configuration of the light guide plate, and has an arc-like rounded corner. The brightness distribution in the light exiting surface of the opposite end portion of the light guide plate was measured for the comparative example and the example when the LEDs of the backlight units were turned on. FIGS. 9 and 10 indicate the results of the comparative experiment. In FIGS. 9 and 10, the dot density changes in accordance with the level of the brightness, which corresponds to the amount of light per unit area of the light exiting surface of the opposite end portion. The brightness decreases as the dot density increases and the brightness increases as the dot density decreases. Although FIG. 9 illustrates the light guide plate according to the comparative example, the same reference numerals as those of the light guide plate 17 according to the example are used for ease of explanation.

The results of the comparative experiment are explained. As illustrated in FIG. 9, in the backlight unit according to the comparative example, the bright portion where the amount of light is locally large was generated at a portion of the light exiting surface 17b of the opposite end portion 23 near the curved end surface 24. This is probably due to the following reason. Almost all the light that has entered the light guide plate through the light entering end surface 17a and traveled in the Y-axis direction toward the curved end surface 24 was totally reflected by the curved end surface 24. The reflected light includes light traveling in the diagonal direction intersecting with the Y-axis direction and light traveling in the substantially X-axis direction. The output of the reflected light was encouraged at the opposite end portion 23 by the inclined surfaces 22a2 of the light collecting pieces 22a included in the light collecting portion 22. In contrast, as illustrated in FIG. 10, in the backlight unit 12 according to the example, the amount of light exiting through the light exiting surface 17b of the opposite end portion 23 is only slightly large, but is not remarkably large, at the portion near the curved end surface 24 compared with that at the other portions. The brightness is sufficiently even. The brightness is evenly distributed probably due to the following reason. The light that has entered the light guide plate 17 through the light entering end surface 17a travels in the Y-axis direction toward the curved end surface 24 and a large amount of the light was absorbed by the total reflection regulator 25 when reached the curved end surface 24. Thus, the amount of light totally reflected by the curved end surface 24, the amount of light traveling in the diagonal direction intersecting with the Y-axis direction, and the amount of light traveling in the substantially X-axis direction, in the opposite end portion 23, are smaller than those in the comparative example. Thus, at the opposite end portion 23, the output of the light was not encouraged by the light collecting pieces 22a included in the light collecting portion 22.

As described above, the backlight unit (lighting unit) 12 according to the embodiment includes the LEDs (light sources) 15, the light guide plate 17 having the light entering end surface 17a that faces the LEDs 15 and to which the light is applied and the light exiting surface 17b that is one of two plate surfaces and through which the light exits, the light collecting portion 22 including the multiple light collecting pieces 22a extending on the light exiting surface 17b in the normal direction with respect to the light entering end surface 17a and arrayed in the orthogonal direction perpendicular to the normal direction, the opposite end portion 23 included in the light guide plate 17 at a side opposite the light entering end surface 17a and having the curved end surface 24 having a curved planar shape over at least a portion of an end surface thereof, and the total reflection regulator 25 disposed on at least a portion of the curved end surface 24 and configured to regulate the amount of light in the opposite end portion 23 to be totally reflected by the curved end surface 24.

In this configuration, the light emitted by the LEDs 15 is applied to the light entering end surface 17a of the light guide plate 17 and travels in the light guide plate 17 to exit through the light exiting surface 17b. The light that has traveled in the light guide plate 17 to the light exiting surface 17b is encouraged to exit by the light collecting pieces 22a included in the light collecting portion 22. The light collecting effect is selectively applied to the outgoing light in the arrangement direction of the light collecting pieces 22a, i.e., the orthogonal direction perpendicular to the normal direction with respect to the light entering end surface 17a. Here, the light in the light guide plate 17, which has been applied to the light entering end surface 17a, travels in the normal direction with respect to the light entering end surface 17a toward the opposite end portion 23 and may be totally reflected, at the opposite end portion 23, by the curved end surface 24 having a curved planar shape. Since the light is totally reflected at a reflection angle corresponding to the incident angle with respect to the curved end surface 24, the light travels in the direction intersecting with (perpendicular to) the normal direction with respect to the light entering end surface 17a. If the reflected light traveling in the direction intersecting with (perpendicular to) the normal direction with respect to the light entering end surface 17a has reached the light exiting surface 17b of the opposite end portion 23, the output of the light is encouraged by the light collecting pieces 22a (light collecting portion 22) extending in the normal direction with respect to the light entering end surface 17a. This may make the opposite end portion 23 to have a local bright portion. To solve the problem, the total reflection regulator 25, which is configured to regulate the amount of light in the opposite end portion 23 to be totally reflected by the curved end surface 24, is disposed over at least a portion of the curved end surface 24 of the opposite end portion 23. This reduces the amount of light in the opposite end portion 23 to be totally reflected by the curved end surface 24 in the direction intersecting with (perpendicular to) the normal direction with respect to the light entering end surface 17a. Thus, the possibility that the light collecting pieces 22a will excessively increase the amount of light exiting through the light exiting surface 17b of the opposite end portion 23 is reduced and a local bright portion is unlikely to be generated. Thus, uneven brightness in the outgoing light is reduced.

In the opposite end portion 23, the curved end surface 24 has an arc-like planar shape having a constant radius of curvature. This configuration allows the light totally reflected by the curved end surface 24 of the opposite end portion 23 to be regularly directed. This allows the formation region of the total reflection regulator 25 on the curved end surface 24, for example, to be readily designed.

Furthermore, the total reflection regulator 25 is positioned at least in a region between the intersection IP1, at which the curved end surface 24 crosses the axis AX1 extending through the curvature center O in the orthogonal direction, and the intersection IP2, at which the curved end surface 24 crosses the straight line L forming an interior angle of "90°−θ" with the axis AX1 in which "θ" is the critical angle of the light guide plate 17 for air. If the light in the light guide plate 17 is totally reflected in the region between the intersection IP1, at which the curved end surface 24 crosses the axis AX1 extending through the curvature center O in the orthogonal direction, and the intersection IP2, at which the curved end surface 24 crosses the straight line L forming an interior angle of "90°−θ" with the axis AX1, the amount of light exiting through the light exiting surface 17b of the opposite end portion 23 remarkably increases because the output of light is encouraged by the light collecting portion 22. The total reflection regulator 25 disposed at least in the above region efficiently reduces the amount of light exiting through the light exiting surface 17b of the opposite end portion 23, efficiently reducing the uneven brightness.

Furthermore, the backlight unit 12 includes the frame 20 having a frame-like shape and surrounding the outer peripheral surface of the light guide plate 17. The light reflectance of the total reflection regulator 25 is lower than that of the frame 20. This configuration reduces the amount of light totally reflected by the curved end surface 24 of the opposite end portion 23, compared with a configuration in which the frame 20 is in contact with the curved end surface 24 of the opposite end portion 23 without the total reflection regulator. Thus, the uneven brightness is reduced.

Furthermore, the total reflection regulator 25 includes the base 25a extending along the curved end surface 24 and fixing layers 25b on the both surfaces of the base 25a. The fixing layers 25b are fixed to the light guide plate 17 and the frame 20. The light reflectance of the surfaces of the base 25a is lower than that of the frame 20. In this configuration, since the fixing layers 25b on the surfaces of the base 25a of the total reflection regulator 25 are fixed to the curved end surface 24 of the light guide plate 17 and the frame 20, the total reflection regulator 25 is fixed to the light guide plate 17 and the frame 20. In this configuration, regardless of which surface of the base 25a of the total reflection regulator 25 faces the light guide plate 17, the surface facing the light guide plate 17 has a lower light reflectance than the frame 20. This configuration makes the installation of the total reflection regulator 25 easy.

Furthermore, the liquid crystal display device (display device) 10 according to this embodiment includes the above-described backlight unit 12 and the liquid crystal panel 11 configured to display an image by using light from the backlight unit 12. The liquid crystal display device 10 having such a configuration has high display quality because the backlight unit 12 configured to apply light to the liquid crystal panel 11 is unlikely to have uneven brightness.

Second Embodiment

A second embodiment of the invention is described with reference to FIG. 11. In the second embodiment, a formation region of a total reflection regulator 125 is different. Configurations, operations, and effects similar to those in the first embodiment are not repeatedly described.

Figure 11:
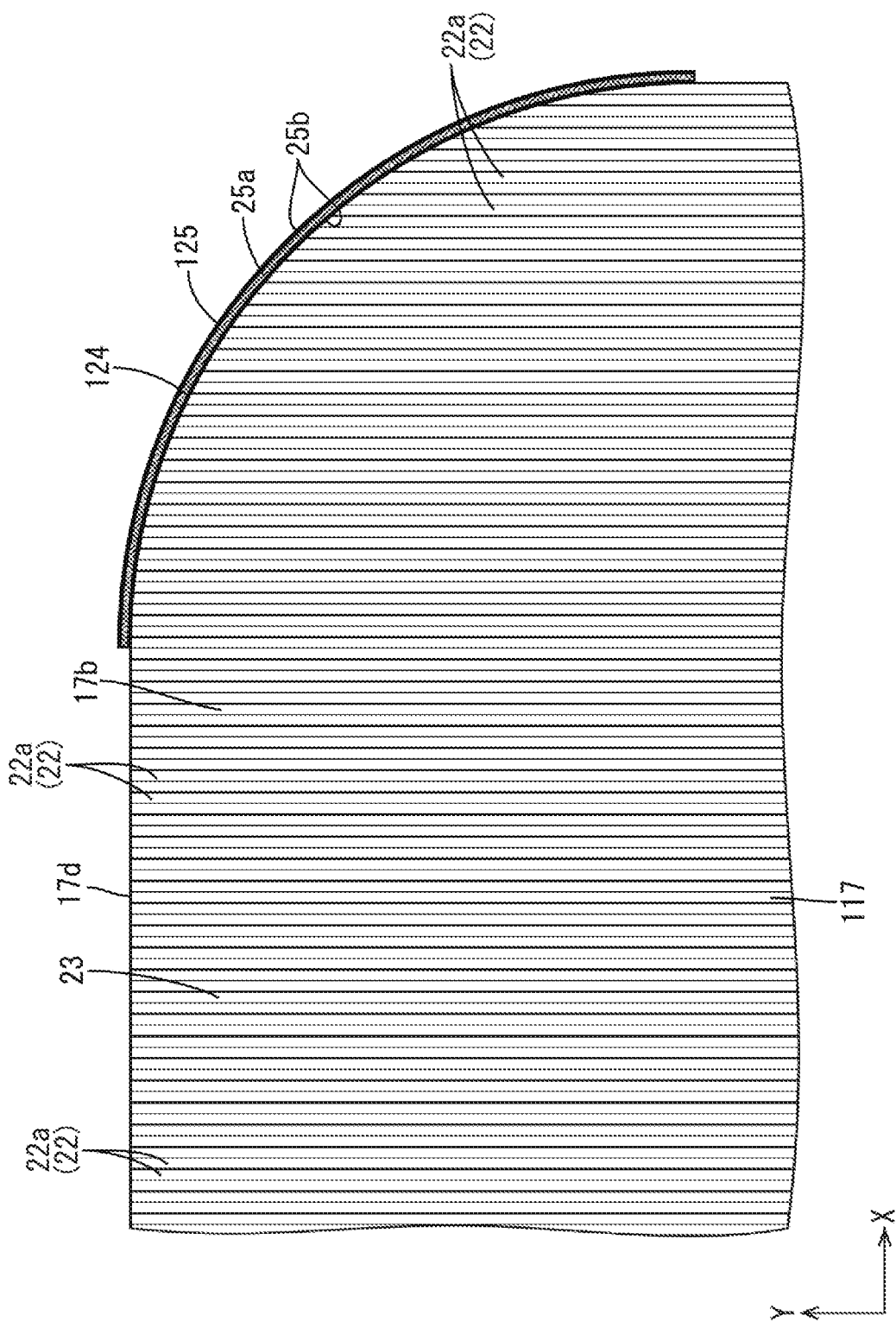
FIG. 11 is a plan view illustrating an opposite end portion and its neighboring portion of a light guide plate included in a backlight unit according to a second embodiment of the invention.

As illustrated in FIG. 11, a total reflection regulator 125 according to this embodiment is disposed over the entire area of a curved end surface 124. In other words, the formation region of the total reflection regulator 125 is the same as the formation region of the curved end surface 124 having the central angle of about 90°. Specifically described, the total reflection regulator 125 is disposed, in addition to the formation region described in the first embodiment (region between the intersection IP1 and the intersection IP2), a region between an intersection IP3, at which an axis AX2 extending through the curvature center O in the normal direction with respect to the light entering end surface (Y-axis direction) crosses the curved end surface 124, and an intersection IP2, at which the straight line L forming an interior angle of "90°−θ" with the axis AX1 perpendicular to the normal direction with respect to the light entering end surface (see FIG. 8) crosses the curved end surface 124. In this configuration, the light that has entered the light guide plate 117 through the light entering end surface travels in the Y-axis direction toward the curved end surface 124 and almost all the light that has reached the curved end surface 124 is absorbed by the total reflection regulator 125. Thus, this configuration more reliably prevents the generation of the uneven brightness.

As described above, in this embodiment, the total reflection regulator 125 is disposed on the entire area of the curved end surface 124. This configuration more reliably prevents the uneven brightness.

Third Embodiment

A third embodiment of the invention is described with reference to FIG. 12. In the third embodiment, the formation region of a total reflection regulator 225 is different from that in the first embodiment. Configurations, operations, and effects similar to those in the first embodiment are not repeatedly described.

Figure 12:
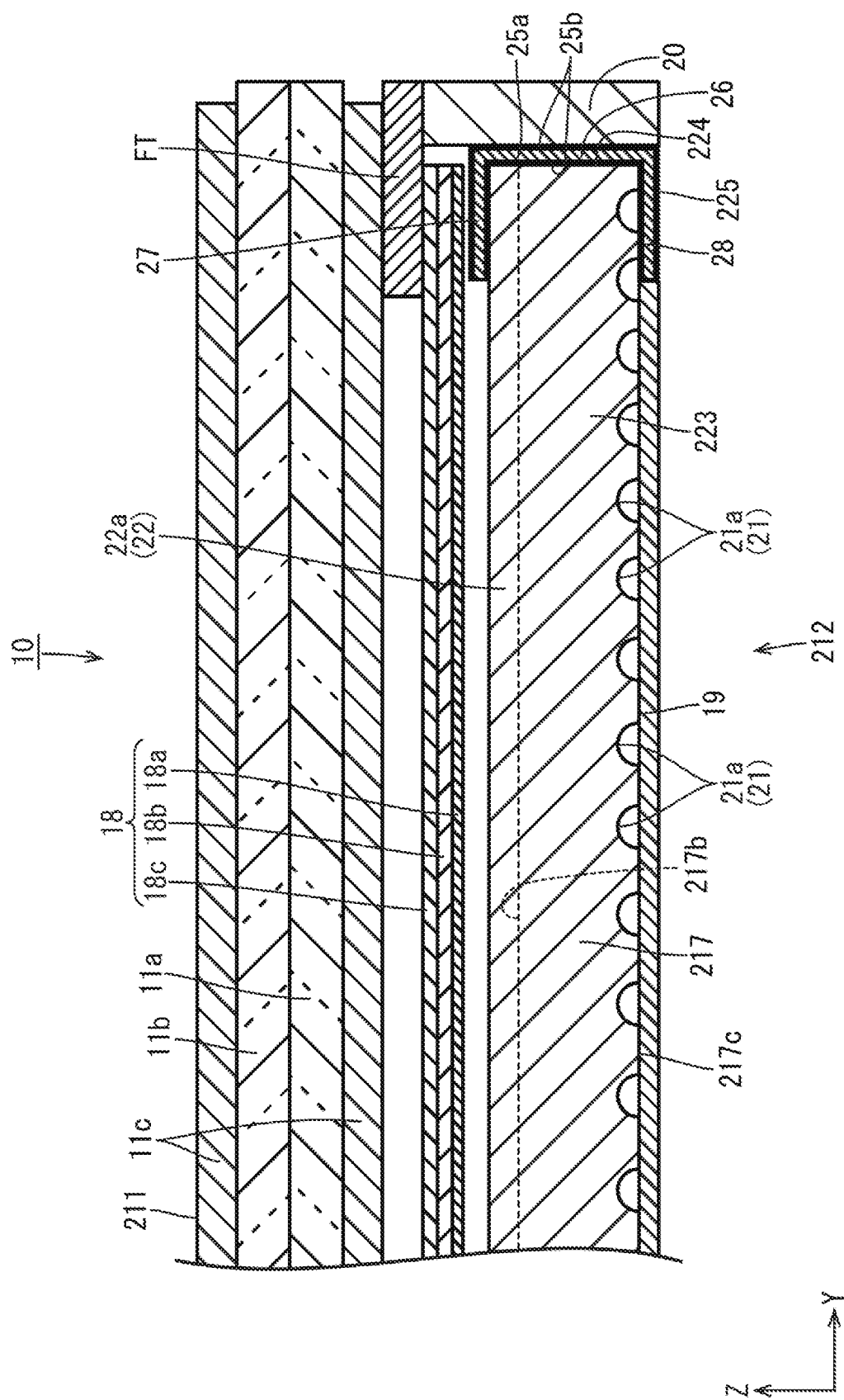
FIG. 12 is a cross-sectional view illustrating a backlight unit according to a third embodiment of the invention taken in a long-side direction.

As illustrated in FIG. 12, a total reflection regulator 225 in this embodiment extends at least to a portion of a light exiting surface 217b and a portion of a opposite plate surface 217c of a opposite end portion 223. Specifically described, the total reflection regulator 225 includes a main body 26 disposed on the curved end surface 224 of the light-exit opposite end portion 223, a light exiting surface side extended regulator 27 disposed on the light exiting surface 217b of the opposite end portion 223, and a opposite plate surface side extended regulator 28 disposed on the opposite plate surface 217c of the opposite end portion 223. The light exiting surface side extended regulator 27 and the opposite plate surface side extended regulator 28 extend from the main body 26. The light exiting surface side extended regulator 27 and the opposite plate surface side extended regulator 28 each curve in plan view along the curved end surface 224 and each have a length substantially equal to the length of the main body 26. The inner edges of the light exiting surface side extended regulator 27 and the opposite plate surface side extended regulator 28, which are located inwardly from the main body 26, are located outwardly from the inner edge of the fixing tape FT. In other words, the inner edges of the light exiting surface side extended regulator 27 and the opposite plate surface side extended regulator 28 are not located in the display area (effective light-emitting region of the backlight unit 212) of the liquid crystal panel 211 and do not adversely affect the display quality.

As described above, since the total reflection regulator 225 includes the light exiting surface side extended regulator 27 and the opposite plate surface side extended regulator 28, the total refection of the light at the light exiting surface 217b and the opposite plate surface 217b of the opposite end portion 223 is regulated. Thus, for example, the light applied to the light entering end surface and traveling in the light guide plate 217 in the Y-axis direction (normal direction with respect to the light entering end surface) toward the curved end surface 224 may reach the light exiting surface 217b or the opposite plate surface 217c of the opposite end portion 223 on the way to the curved end surface 224. In such a case, a large amount of the light is absorbed by the light exiting surface side extended regulator 27 and the opposite plate surface side extended regulator 28. This reduces the light totally reflected by the light exiting surface 217b and the light exiting surface opposite surface 217c toward the curved end surface 224. Furthermore, some of the light that has reached the curved end surface 224 is absorbed by the main body 26 of the total reflection regulator 225 and the remaining of the light is totally reflected by the curved end surface 224. The reflected light may reach the light exiting surface 217b or the opposite plate surface 217c of the opposite end portion 223. In such a case, a large amount of the light is absorbed by the light exiting surface side extended regulator 27 and the opposite plate surface side extended regulator 28. This reliably reduces the uneven brightness.

As described above, in this embodiment, the total reflection regulator 225 includes the light exiting surface side extended regulator 27 extending to at least a portion of the light exiting surface 217b of the opposite end portion 223. With this configuration, the light exiting surface side extended regulator 27 regulates the total reflection of light at the light exiting surface 217b of the opposite end portion 223. Thus, for example, the amount of light in the light guide plate 217 totally reflected by the light exiting surface 217b of the opposite end portion 223 to the curved end surface 224 is reduced while the light is traveling in the normal direction with respect to the light input surface. This more reliably reduces the uneven brightness.

Furthermore, the light guide plate 217 has the opposite plate surface 217c that is one of the two plate surfaces. The total reflection regulator 225 includes the opposite plate surface side extended regulator 28 extending to at least a portion of the opposite plate surface 217c of the opposite end portion 223. With this configuration, the opposite plate surface side extended regulator 28 regulates the total reflection of light at the opposite plate surface 217c of the opposite end portion 223. Thus, for example, the amount of light in the light guide plate 217 totally reflected by the opposite plate surface 217c of the opposite end portion 223 to the curved end surface 224 is reduced while the light is traveling in the normal direction with respect to the light input surface. This more reliably reduces the uneven brightness.

Fourth Embodiment

A fourth embodiment of the invention is described with reference to FIG. 13 or FIG. 14. In the fourth embodiment, a total reflection regulator 325 has a configuration different from that in the second embodiment. Configurations, operations, and effects similar to those in the second embodiment are not repeatedly described.

Figure 13:
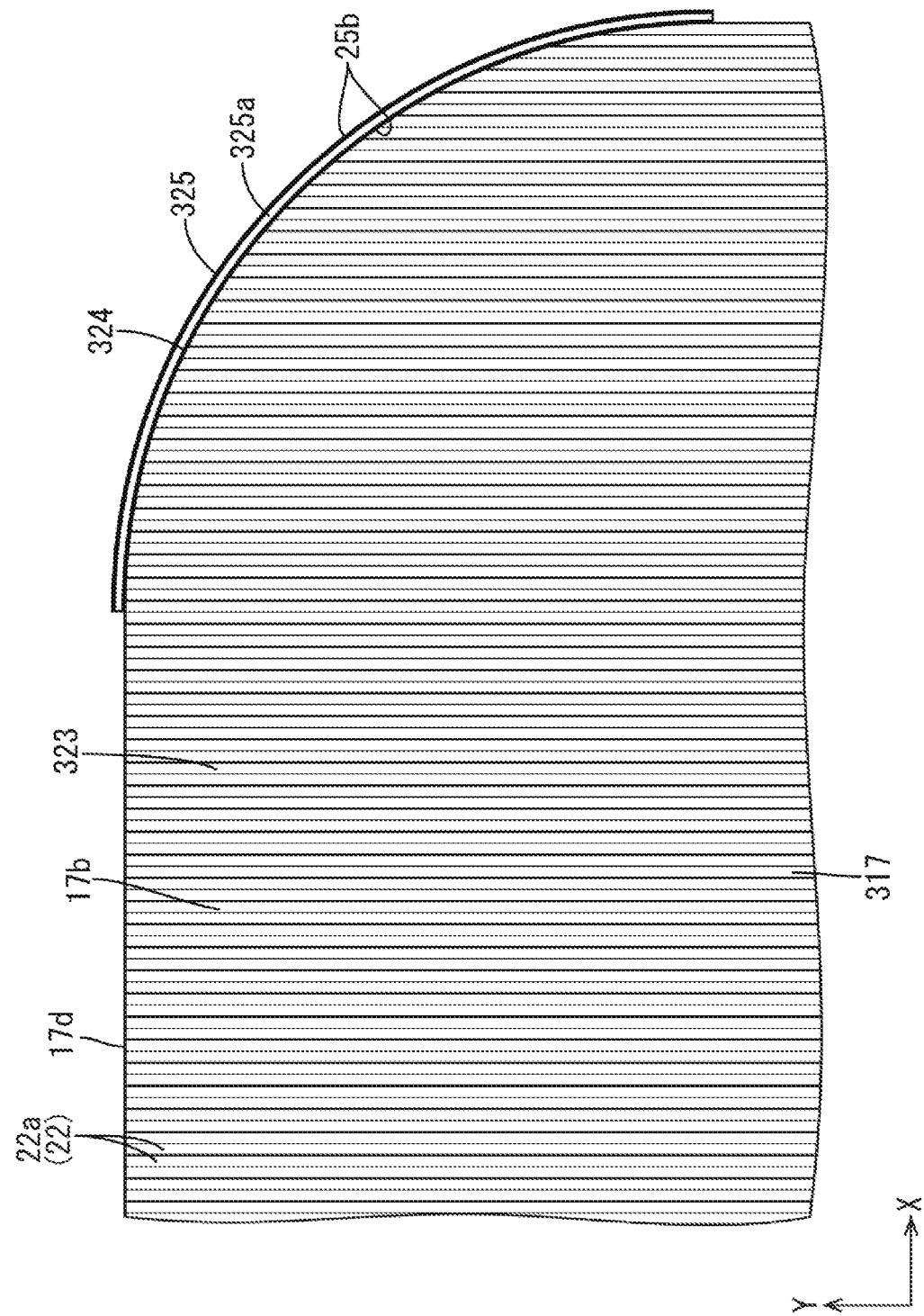
FIG. 13 is a plan view illustrating an opposite end portion and its neighboring portion of a light guide plate included in a backlight unit according to a fourth embodiment of the invention.
Figure 14:
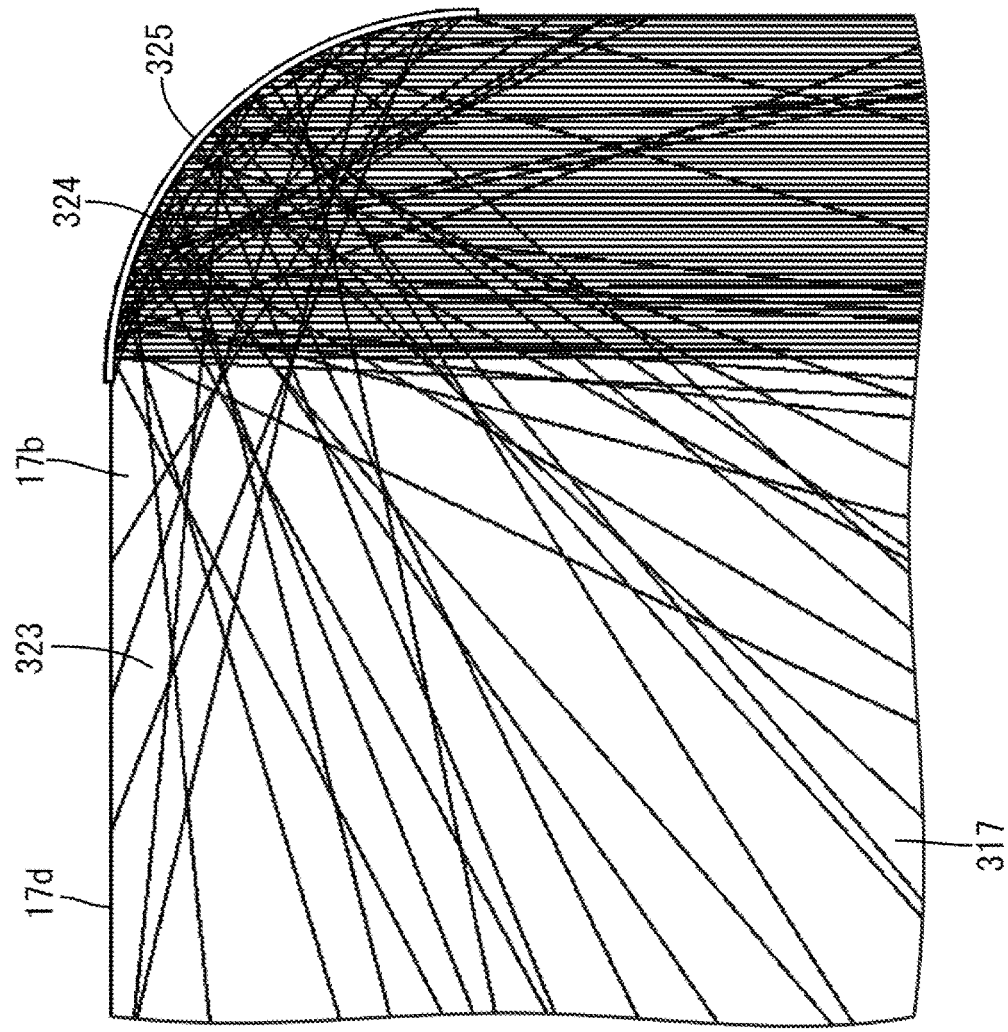
FIG. 14 is a plan view illustrating a light guide plate in which a result of ray tracing of light traveling in the light guide plate is indicated.

As illustrated in FIG. 13, the total reflection regulator 325 in this embodiment is configured to scatter and reflect the light in a light guide plate 317 traveled to a curved end surface 324. Specifically described, the total light reflection regulator 325 includes a base 325a formed of foamed resin (such as foamed PET and foamed PC) having a white color. The light is scattered and reflected by the surface of the base 325a, i.e., in all directions in a random manner. As illustrated in FIG. 14, with the total reflection regulator 325 being disposed on the curved end surface 324, when the light applied through the light input surface has reached the curved end surface 324 after travelling in the light guide plate 317 in the Y-axis direction (normal direction with respect to the light input surface), the light is scattered and reflected by the surface of the base 325a of the total reflection regulator 325. This makes the traveling directions of the reflection light random. This configuration not only suppresses the excessive amount of the light exiting through the light-exit opposite end portion 323 but also provides high light use efficiency compared with a configuration of the first to third embodiments in which the total reflection regulator absorbs a large amount of the light to regulate the total reflection at the curved end surface. This configuration reliably reduces the uneven brightness and reduces the possibility that the brightness will decrease at a portion around the curved end surface 324.

As described above, in this embodiment, the total reflection regulator 325 scatters and reflects the light traveled to the curved end surface 324 in the light guide plate 317. This configuration improves the light use efficiency compared with a configuration in which the total reflection regulator absorbs a large amount of the light to regulate the total reflection at the curved end surface 324, reducing the possibility that the brightness will decrease at a portion around the curved end surface 324.

Fifth Embodiment

A fifth embodiment of the invention is described with reference to FIG. 15 or FIG. 16. In the fifth embodiment, a total reflection regulator 425 has a configuration different from that in the second embodiment. Configurations, operations, and effects similar to those in the second embodiment are not repeatedly described.

Figure 15:
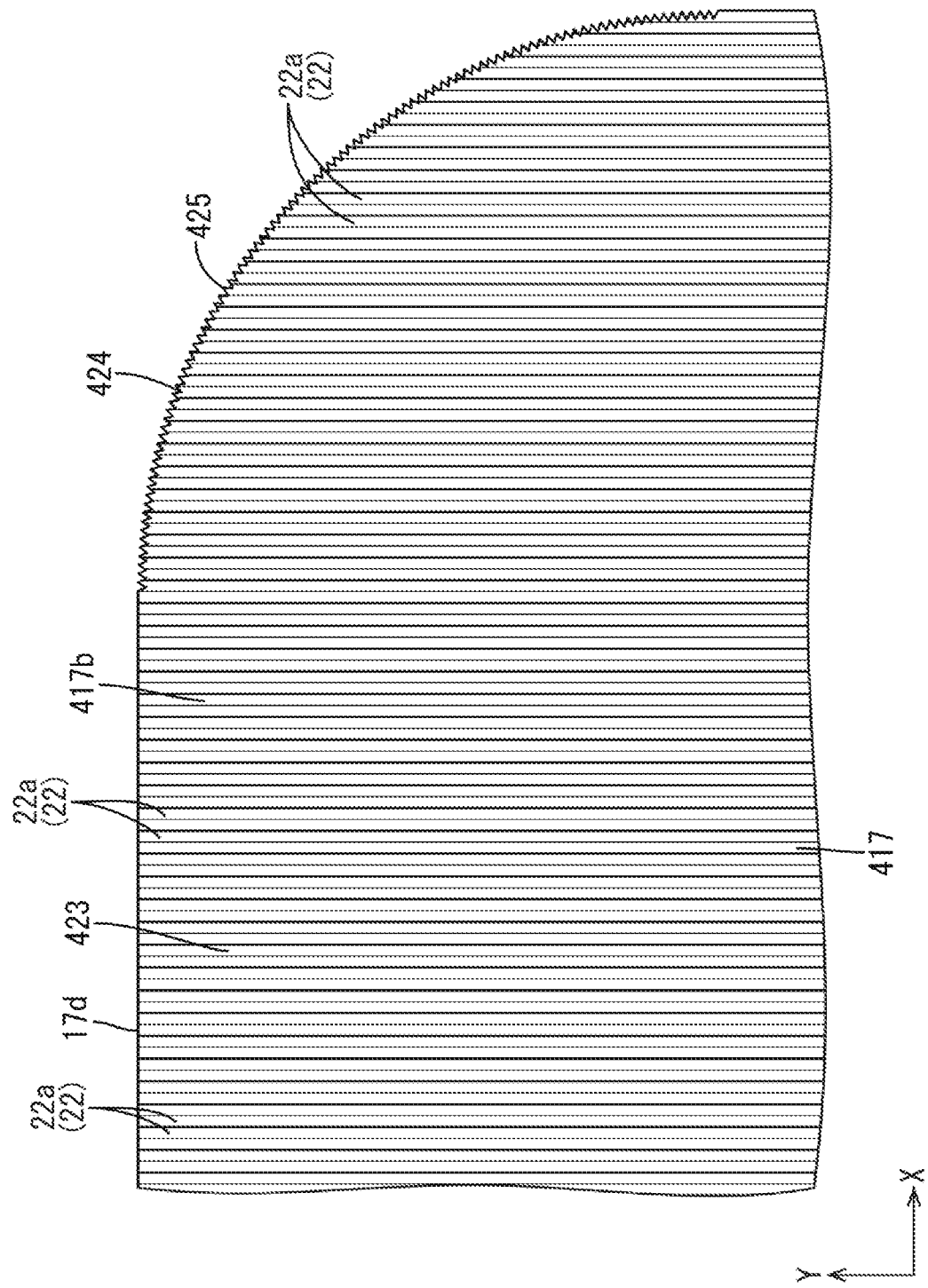
FIG. 15 is a plan view illustrating the opposite end portion and its neighboring portion of a light guide plate included in a backlight unit according to a fifth embodiment of the invention.
Figure 16:
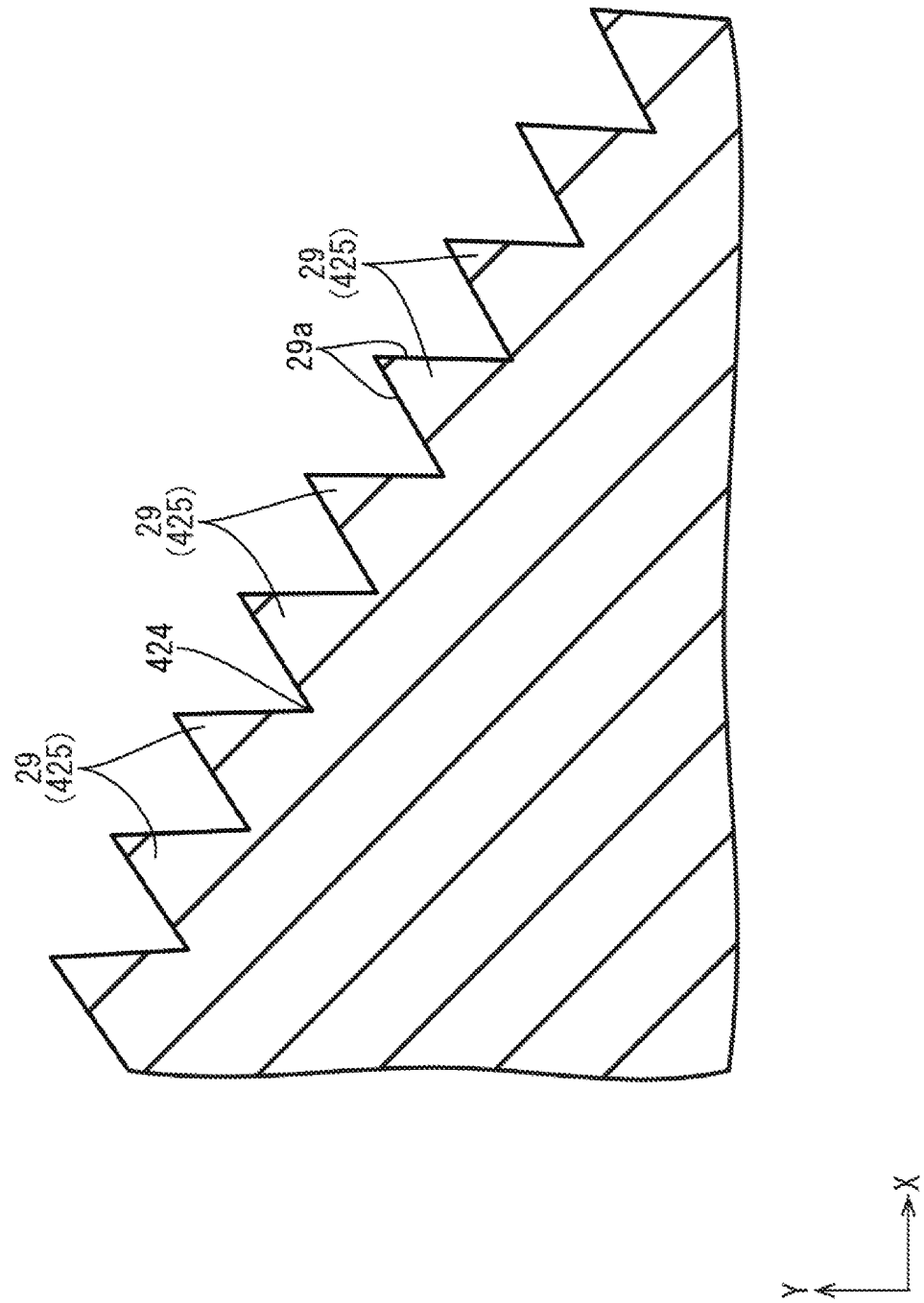
FIG. 16 is a magnified planar cross-sectional view illustrating a total reflection regulator.

As illustrated in FIG. 15, the total reflection regulator 425 according to this embodiment includes fine protrusions (recesses) 29 on a curved end surface 424 of a opposite end portion 423. As illustrated in FIG. 16, the protrusions 29 protrude outwardly from the curved end surface 424 in a substantially triangular planar shape and extend linearly in the Z-axis direction (normal direction with respect to a light exiting surface 417b). The protrusions 29 are arranged side by side with no space therebetween (adjoining to each other) along the planar shape of the curved end surface 424. The arrangement pitch of the protrusions 29 is about 0.25 mm, for example. The height of the protrusions 29 protruding from the curved end surface 424 is about 0.125 mm, for example. The specific values of the pitch and the height are not limited to the examples. In the total reflection regulator 425 having such a configuration, when the light applied through the light entering end surface has reached the curved end surface 424 after travelling in the light guide plate 417 in the Y-axis direction (normal direction with respect to the light entering end surface), the light is applied to inclined surfaces 29a of the protrusions 29, which are included in the total reflection regulator 425, at various incident angles. This makes the traveling directions of light totally reflected by the inclined surfaces 29a of the protrusions 29 substantially random. As the fourth embodiment, this configuration not only suppresses the excessive amount of light exiting from the opposite end portion 423 but also improves the light use efficiency. Furthermore, since this configuration does not scatter and reflect the light as in the fourth embodiment and totally reflects the light at the inclined surfaces 29a of the protrusions 29, this configuration further improves the light use efficiency. Furthermore, since the total reflection regulator 425 is integral with the light guide plate 417, the number of components is smaller than that in the first to fourth embodiments in which the total reflection regulator is a separate member from the light guide plate, leading to a reduction in the production cost.

As described above, in this embodiment, the total reflection regulator 425 is formed of the protrusions 29 or the recesses in the curved end surface 424. This configuration has high use efficiency than that in the configuration in which the light is scattered and reflected to regulate the total reflection at the curved end surface 424. Thus, this configuration more reliably reduces a decrease in brightness, possibly caused at a portion around the curved end surface 424.

Sixth Embodiment

A sixth embodiment of the invention is described with reference to FIG. 17. In the sixth embodiment, the planar shape of a light guide plate 517 and the number of total reflection regulators 525 are different from those in the second embodiment. Configurations, operations, and effects similar to those in the second embodiment are not repeatedly described.

Figure 17:
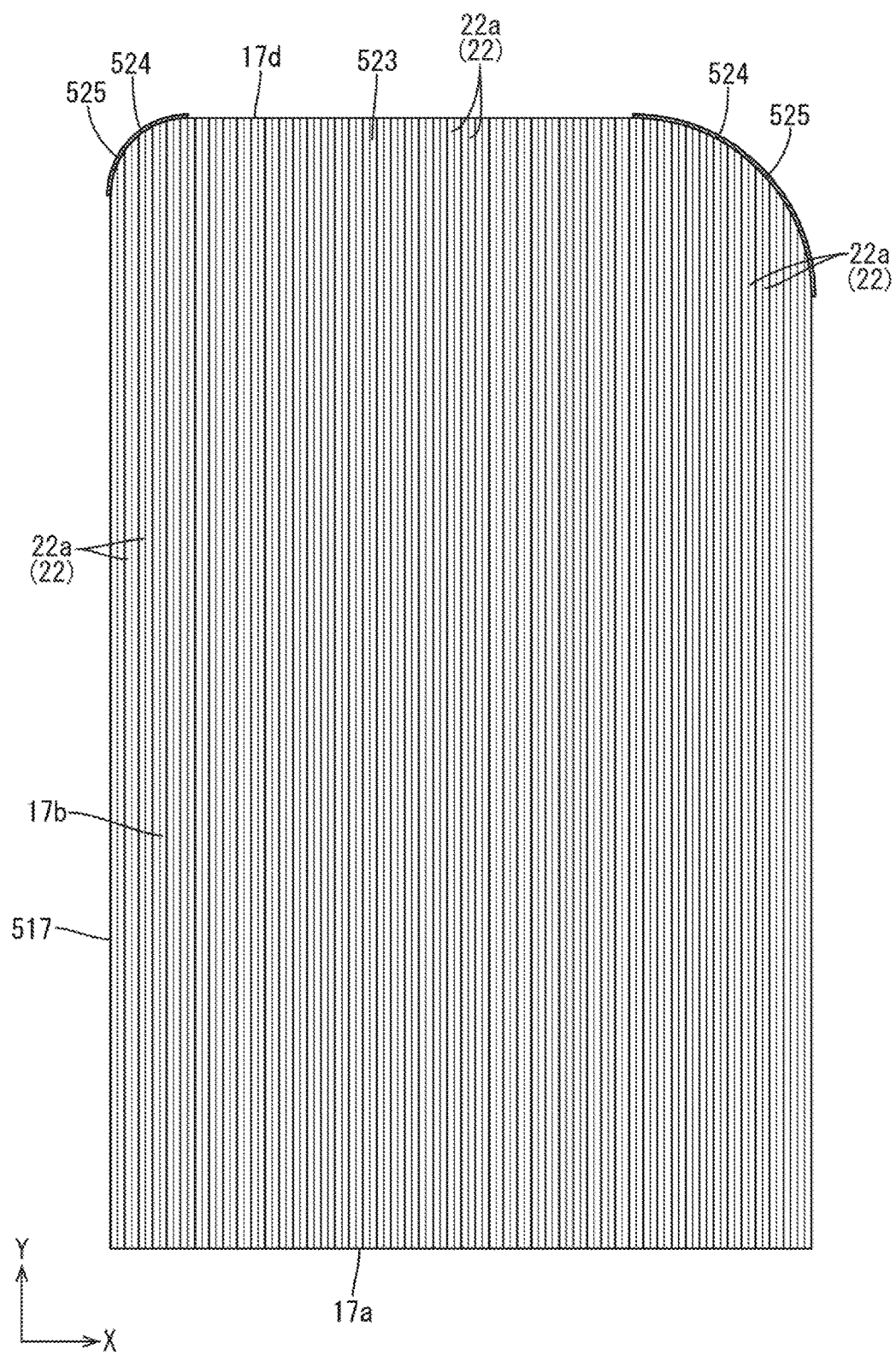
FIG. 17 is a plan view illustrating a light guide plate included in a backlight unit according to a sixth embodiment of the invention.

As illustrated in FIG. 17, a opposite end portion 523 have two corners each rounded in an arc-like shape such that a light guide plate 517 in this embodiment has two curved end surfaces 524. One of the curved end surfaces 524 (at the right side in FIG. 17) has the same configuration as that in the first to fifth embodiments. However, the other of the curved end surfaces 524 has a smaller radius of curvature than the one at the right side. Total reflection regulators 525 are disposed on the respective curved end surfaces 524. The radius of curvature and the formation region of each of the total reflection regulators 525 are determined in accordance with the curved end surface 524, onto which the total reflection regulators 525 are mounted. One of the total reflection regulators 525 that is disposed on one of the curved end surfaces 524 has a smaller radius of curvature and a smaller length in plan view than the other of the total reflection regulators 525 that is disposed on the other of the curved end surfaces 524. The planar shape of the frame (not illustrated) preferably corresponds to the planar shape of the light guide plate 517.

Other Embodiments

The present invention is not limited to the embodiments described above and illustrated by the drawings. For example, the following embodiments will be included in the technical scope of the present invention.

Figure 18:
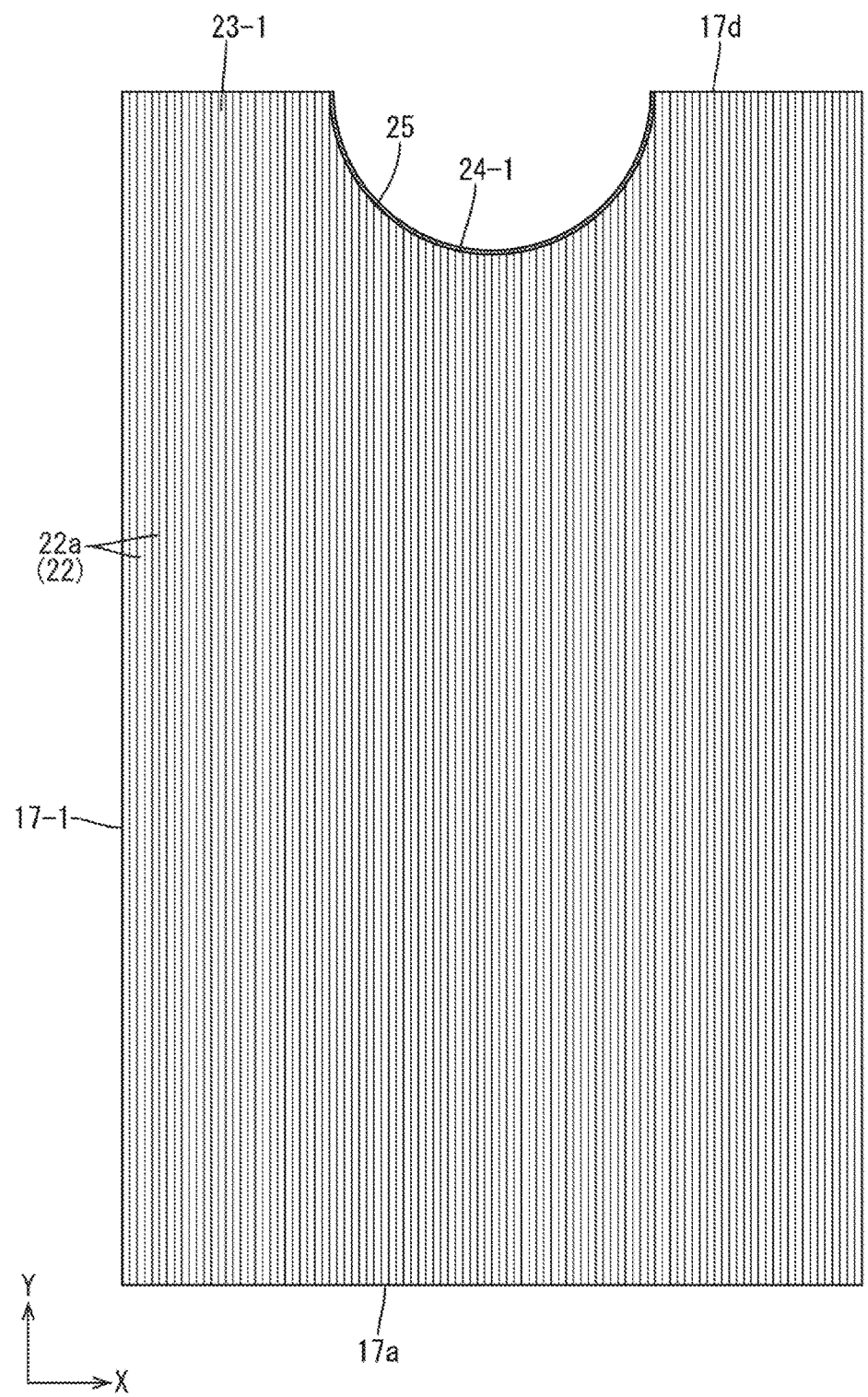
FIG. 18 is a plan view illustrating a light guide plate included in a backlight unit according to an embodiment (1) of the invention.

(1) The outer shape of the light guide plate may be suitably changed from that in the above embodiments. For example, as illustrated in FIG. 18, a curved end surface 24-1 may be located at a middle in the X-axis direction (orthogonal direction) of a opposite end portion 23-1 of a light guide plate 17-1. The frame (not illustrated) preferably has a planar shape corresponding to the planar shape of the light guide plate 17-1.

(2) The specific configuration of the light collecting portion may be suitably changed from that in the above embodiments. For example, as illustrated in FIG. 19, light collecting pieces 22a-2 included in a light collecting portion 22-2 may be arranged in the X-axis direction (orthogonal direction) with a space therebetween (a substantially flat portion may be interposed between adjacent light collecting pieces 22a-2).

(3) The specific configuration of the light collecting portion may be suitably changed from that in the above embodiments. For example, as illustrated in FIG. 20, light collecting pieces 22a-3 included in a light collecting portion 22-3 each may have a trapezoidal cross-sectional shape.

(4) The specific configuration of the light collecting portion may be suitably changed from that in the above embodiments. For example, as illustrated in FIG. 21, light collecting pieces 22a-4 included in a light collecting portion 22-4 each may have a semi-circular cross-sectional shape (lenticular lens).

(5) As a modification of the fifth embodiment, as illustrated in FIG. 22, protrusions 29-5 protruding from a curved end surface 24-5 each may have a rounded top.

(6) In the above embodiments, the central angle of the curved end surface is 90°. However, the central angle of the curved end surface may be larger than or smaller than 90°. Furthermore, the specific value of the radius of curvature of the curved end surface may be suitably changed.

(7) The specific area ratio of the curved end surface to the entire end surface of the opposite end portion may be suitably changed from those indicated in the drawings of the above embodiments.

(8) In the above embodiments, a portion of the end surface of the opposite end portion is the curved end surface. However, the entire end surface of the opposite end portion may be the curved end surface.

(9) In the above embodiments, the curved end surface has an arc-like shape extending in an exact circular curve or an elliptical curve. However, the curved end surface may extend in a free curve.

(10) The specific material of the light guide plate may be suitably changed from those in the above embodiments. If the material of the light guide plate is changed, the specific design of the total reflection regulator on the opposite end portion may be changed accordingly by using the technique described in the first embodiment, for example, because the critical angle of the light guide plate for air varies depending on the reflectance of the material.

(11) The embodiment (1) and any one of the embodiments other than the embodiment (1) may be combined together to have a light guide plate having two or three curved end surfaces. A light guide plate may have four or more curved end surfaces.

(12) In the above embodiments (except for the fourth embodiment), the total reflection regulator has black inner and outer surfaces. However, only the inner surface (adjacent to the light guide plate) of the total reflection regulator may be black and the outer surface (adjacent to the frame)

may be in any color other than black. In this configuration, regardless of the color of the outer surface of the total reflection regulator, the same effects and advantages as those in the above embodiments are obtained.

(13) In the above fourth embodiment, the inner and outer surfaces of the total reflection regulator are white. However, only the inner surface (adjacent to the light guide plate) may be white and the outer surface (adjacent to the frame) may be in any color other than white. In this configuration, regardless of the color of the outer surface of the total reflection regulator, the same effects and advantages as those in the fourth embodiment are obtained.

(14) In the above embodiments (except for the fourth embodiment), the total reflection regulator is black. However, the color of the surfaces of the total reflection regulator may be suitably changed to any color, such as gray. In such a case, the color is preferably an achromatic color having a lower light reflectance than the frame and having high light absorptivity.

(15) In the above embodiments, the total reflection regulator is a tape attached to the curved end surface. However, the total reflection regulator may be a coating material applied to the curved end surface.

(16) The specific formation region of the total reflection regulator on the curved end surface may be suitably changed from those in the above embodiments. In such a case, the modified formation region preferably includes the formation region (region between the intersection IP1 and the intersection IP2) described in the first embodiment, but the invention is not limited to such a configuration. Furthermore, the total reflection regulator may extend beyond the curved end surface (to the straight end surface). Alternatively, the curved end surface may have a portion not having the total reflection regulator at any position in the Z-axis direction.

(17) The configuration in the first embodiment may be combined with the configuration in any one of the fourth to sixth embodiments or the configuration described in anyone of the above (1) to (5).

(18) In the third embodiment, the inner edge of the light exiting surface side extended regulator and the inner edge of the opposite plate surface side extended regulator may be substantially aligned with the inner edge of the fixing tape. Alternatively, the inner edge of the light exiting surface side extended regulator and the inner edge of the opposite plate surface side extended regulator may be away from each other. The inner edge of the light exiting surface side extended regulator may be located inwardly or outwardly from the inner edge of the opposite plate surface side extended regulator.

(19) In the third embodiment, the total reflection regulator includes the light exiting surface side extended regulator and the opposite plate surface side extended regulator. However, the total reflection regulator may include only the light exiting surface side extended regulator without the opposite plate surface side extended regulator. Alternatively, the total reflection regulator may include only the opposite plate surface side extended regulator without the light exiting surface side extended regulator.

(20) The configuration in the third embodiment may be combined with the configuration in any one of the second, fourth to sixth embodiments or the configuration described in any one of the above (1) to (5).

(21) The configuration in the fourth embodiment may be combined with the configuration in the sixth embodiment or the configuration described in any one of the above (1) to (4).

(22) In the fifth embodiment, the protrusions (recesses) extend linearly in the Z-axis direction. However, the protrusions or the recesses in the form of dots may be two-dimensionally dispersed in the plane of the curved end surface.

(23) The configuration in the fifth embodiment may be combined with the configuration in the sixth embodiment or the configuration described in any one of the above (1) to (4).

(24) In the sixth embodiment, the two curved end surfaces have different radiuses of curvature. However, the curved end surfaces may have the same radius of curvature. Furthermore, the invention is not limited to the configuration in which the total reflection regulators are disposed over the entire area of the respective curved end surfaces. The total reflection regulator may be disposed only over a portion of any one of the curved end surfaces or the total reflection regulator may be disposed over a portion of each of the curved end surfaces.

(25) The configuration in the sixth embodiment may be combined with the configuration described in any one of the above (1) to (5).

(26) The configurations described in the embodiments (1) to (5) may be suitably combined together.

(27) In the above embodiments, the liquid crystal panel and the backlight unit are fixed together by the fixing tape. However, the fixing tape may be eliminated. When this configuration is applied to the third embodiment, the light exiting surface side extended regulator and the opposite plate surface side extended regulator, which extend inwardly from the main body of the total reflection regulator, each preferably have a length of 1 mm or less. However, the invention is not limited to this configuration.

(28) In the above embodiments, the light collecting pieces included in the light collecting portion protrude from the light exiting surface. However, the light collecting pieces included in the light collecting portion may be recessed from the light exiting surface.

(29) In the above embodiments, the light-exit pieces included in the outgoing light reflective portion are recesses in the opposite plate surface of the light guide plate. However, the light-exit pieces may protrude from the opposite plate surface of the light guide plate. Alternatively, the light-exit pieces may be printed on the opposite plate surface of the light guide plate. In such a case, printing techniques, such as a technique using a dispenser, an inkjet technique, and a technique using a screen plate may be employed. Alternatively, a vapor-deposition technique may be employed to form the light-exit pieces on the opposite plate surface of the light guide plate.

(30) The specific number or the kind of the optical sheets used in the backlight unit may be suitably changed from those in the above embodiments. Specific examples of the optical sheet include, but are not limited to, a reflective polarizing sheet ("DBEF" available from 3M Japan Limited) and a turning lens sheet having a lens on a plate surface adjacent to the light guide plate.

(31) The reflective sheet covering the opposite plate surface of the light guide plate may be eliminated from the above embodiments.

(32) The number of the LEDs on the LED board may be suitably changed from that in the above embodiments.

(33) In the above embodiments, the LEDs are the side-surface light emitting LEDs but may be top-surface light emitting type LEDs. Furthermore, light sources other than the LED (organic EL, for example) may be employed.

(34) In the above embodiments, the liquid crystal display device includes the liquid crystal panel as a display panel. However, the present invention is applicable to a MEMS display device including a micro electro mechanical system (MEMS) display panel as a display panel.

(35) In the above embodiments, the total reflection regulator includes the fixing layers on the front and rear surfaces of the base (two-side tape structure). However, the total reflection regulator may include a fixing layer on only one surface of the base (one-side tape structure). In such a case, the fixing layer is disposed on the surface of the base adjacent to the light guide plate to fix the total reflection regulator to the curved end surface.

EXPLANATION OF SYMBOLS

10 . . . liquid crystal display device (display device), 11, 211 . . . liquid crystal panel (display panel), 12, 212 . . . backlight unit (lighting unit), 15 . . . LED (lighting source), 17, 17-1, 117, 217, 317, 417, 517 . . . light guide plate, 17a . . . light entering end surface, 17b, 217b, 417b . . . light exiting surface, 17c, 217c . . . opposite plate surface, 17d . . . opposite end surface, 20 . . . frame, 22, 22-2, 22-3, 22-4 . . . light collecting portion, 22a, 22a-2, 22a-3, 22a-4 . . . light collecting piece, 23, 23-1, 223, 323, 423, 523 . . . opposite end portion, 24, 24-1, 24-5, 124, 224, 324, 524 . . . curved end surface, 25, 125, 225, 325, 425, 525 . . . total reflection regulator, 25a, 325a . . . base, 25b . . . fixing layer, 27 . . . light exiting surface side extended regulator, 28 . . . opposite plate surface side extended regulator, 29, 29-5 . . . protrusion, AX . . . axis line, IP1 . . . intersection, IP2 . . . intersection, L . . . straight line, O . . . curvature center

The invention claimed is:

1. A lighting unit comprising:
   a light source;
   a light guide plate including a light entering end surface opposed to the light source and through which light enters and a light exiting surface that is one of two plate surfaces and through which the light exits;
   a light collecting portion including a plurality of light collecting pieces extending on the light exiting surface in a normal direction with respect to the light entering end surface and arrayed in an orthogonal direction perpendicular to the normal direction;
   an opposite end portion included in the light guide plate on an opposite side from the light entering end surface, at least a section of the opposite end portion including a curved end surface having an edge that is curved in a plan view; and
   a total reflection regulator disposed on at least a portion of the curved end surface and configured to regulate an amount of light in the opposite end portion to be totally reflected by the curved end surface.

2. The lighting unit according to claim 1, wherein the curved end surface of the opposite end portion has an arc-like planar shape having a constant radius of curvature.

3. The lighting unit according to claim 2, wherein the total reflection regulator is positioned at least in a region between a first intersection between the curved end surface and an axis line extending through a center of curvature in the orthogonal direction and a second intersection between the curved end surface and a straight line forming an internal angle of "90°−θ" with the axis line, "θ" being a critical angle of the light guide plate for air.

4. The lighting unit according to claim 1, wherein the total reflection regulator is disposed over an entire area of the curved end surface.

5. The lighting unit according to claim 1, wherein the total reflection regulator includes a light exiting surface side extended regulator extending to at least a portion of the light exiting surface of the light input opposite end portion.

6. The lighting unit according to claim 1, wherein the light guide plate has an opposite plate surface that is the other of the two plate surfaces, and
   the total reflection regulator includes an opposite plate surface side extended regulator extending to at least a portion of the opposite plate surface of the opposite end portion.

7. The lighting unit according to claim 1, further comprising a frame having a frame-like shape and surrounding an outer peripheral surface of the light guide plate, wherein
   the total reflection regulator has a light reflectance lower than that of the frame.

8. The lighting unit according to claim 7, wherein the total reflection regulator includes a base extending along the curved end surface and fixing layers on both surfaces of the base, the fixing layers being fixed to the light guide plate and the frame, and
   the surfaces of the base each have a reflectance lower than that of the frame.

9. The lighting unit according to claim 1, wherein the total reflection regulator is configured to scatter and reflect the light traveled to the curved end surface in the light guide plate.

10. The lighting unit according to claim 1, wherein the total reflection regulator is formed of a plurality of protrusions or a plurality of recesses in the curved end surface.

11. A display device comprising:
    the lighting unit according to claim 1; and
    a display panel configured to display an image by using light from the lighting unit.

* * * * *